(12) United States Patent
Chi et al.

(10) Patent No.: US 12,515,895 B2
(45) Date of Patent: Jan. 6, 2026

(54) MOVER AND MIXED CONVEYOR LINE WITH MOVER

(71) Applicant: SHANGHAI GOLYTEC AUTOMATION CO., LTD., Shanghai (CN)

(72) Inventors: Feng Chi, Shanghai (CN); Wenhua Li, Johor Bahru (MY); Lin Guo, Shanghai (CN)

(73) Assignee: SHANGHAI GOLYTEC AUTOMATION CO., LTD., Shanghai (CN)

( * ) Notice: Subject to any disclaimer, the term of this patent is extended or adjusted under 35 U.S.C. 154(b) by 131 days.

(21) Appl. No.: 18/575,790

(22) PCT Filed: Mar. 2, 2023

(86) PCT No.: PCT/CN2023/079425
§ 371 (c)(1),
(2) Date: Dec. 29, 2023

(87) PCT Pub. No.: WO2024/060517
PCT Pub. Date: Mar. 28, 2024

(65) Prior Publication Data
US 2025/0083906 A1  Mar. 13, 2025

(30) Foreign Application Priority Data

Sep. 21, 2022 (CN) .......................... 202222504907.4
Sep. 30, 2022 (CN) .......................... 202211211003.0
Sep. 30, 2022 (CN) .......................... 202211219655.9

(51) Int. Cl.
*B65G 54/02* (2006.01)
*H02K 41/02* (2006.01)
*H02K 41/03* (2006.01)

(52) U.S. Cl.
CPC ............. *B65G 54/02* (2013.01); *H02K 41/02* (2013.01); *H02K 41/033* (2013.01); *B65G 2203/0283* (2013.01); *H02K 41/031* (2013.01)

(58) Field of Classification Search
CPC .... B65G 54/02; H02K 41/031; H02K 41/033; H02K 41/02
(Continued)

(56) References Cited

U.S. PATENT DOCUMENTS 4,315,568 A * 2/1982 Mojden .............. B65G 21/2018
                                                    198/690.1
6,876,896 B1 * 4/2005 Ortiz .................. B29C 65/7867
                                                    318/135
(Continued)

FOREIGN PATENT DOCUMENTS

CN     105610261 A  *  5/2016  ............... H02K 3/28
CN     113401666 A  *  9/2021  ............. B65G 37/00
(Continued)

OTHER PUBLICATIONS

The extended search report of counterpart EP application No. 23828139.8 issued on Apr. 15, 2025.

*Primary Examiner* — James R Bidwell
(74) *Attorney, Agent, or Firm* — The Sun IP Law

(57) ABSTRACT

The disclosure provides a mover and a mixed conveyor line having the mover. The mover is movable mounted on the magnetic power conveyor line or the mixed conveyor line. The magnetic power conveyor line includes a first armature winding; and the mixed conveyor line includes a first driving mechanism. The mover includes: a mover body, including a first permanent magnet array, the first permanent magnet array including two first permanent magnets which are oppositely spaced apart from each other, and the two first permanent magnets and the first armature winding driving, by means of current excitation, the mover body to move (Continued)

along the magnetic power conveyor line; and a driven assembly, connected with the mover body, and configured to be in transport connection with the first driving mechanism and drive the mover body to move along the magnetic power conveyor line or the mixed conveyor line.

29 Claims, 15 Drawing Sheets

(58) Field of Classification Search
USPC .......................................................... 198/805
See application file for complete search history.

(56) References Cited

U.S. PATENT DOCUMENTS

| | | | |
|---|---|---|---|
| 10,056,813 | B2 | 8/2018 | Rozinsky |
| 11,964,832 | B2* | 4/2024 | Hogan .................... B65G 54/02 |
| 2025/0105716 | A1* | 3/2025 | Chi ........................... H02K 3/26 |
| 2025/0125702 | A1* | 4/2025 | Qin ......................... H02K 41/03 |

FOREIGN PATENT DOCUMENTS

| | | |
|---|---|---|
| CN | 113859892 A | 12/2021 |
| CN | 114070004 A | 2/2022 |
| CN | 114655678 A | 6/2022 |
| CN | 216763528 U | 6/2022 |
| CN | 216917445 U | 7/2022 |
| CN | 218201017 U | 1/2023 |
| CN | 218464740 U | 2/2023 |
| CN | 218733809 U | 3/2023 |
| EP | 3243263 B1 | 11/2018 |
| EP | 3501878 B1 | 7/2022 |
| EP | 4053052 A1 | 9/2022 |
| KR | 20180082046 A | 7/2018 |
| WO | WO-2019007200 A1 * | 1/2019 ............. H02K 41/02 |
| WO | 2019171456 A1 | 9/2019 |

* cited by examiner

MOVER AND MIXED CONVEYOR LINE WITH MOVER

CROSS-REFERENCE TO RELATED APPLICATIONS

The disclosure claims priority to the following three patent applications:
1. priority to Chinese Patent Application No. 202211219655.9, filed to the China National Intellectual Property Administration on Sep. 30, 2022 and entitled "Mover and Mixed Conveying Line";
2. priority to Chinese Patent Application No. 202222504907.4, filed to the China National Intellectual Property Administration on Sep. 21, 2022 and entitled "Mover and Conveying Device"; and
3. priority to Chinese Patent Application No. 202211211003.0, filed to the China National Intellectual Property Administration on Sep. 30, 2022 and entitled "Auxiliary Conveyor Line and Mixed Conveyor Line".

TECHNICAL FIELD

The disclosure relates to the technical field of conveying device, and specifically, to a mover and a mixed conveyor line with the mover.

BACKGROUND

In the related art, a transport line generally includes movers for transporting materials, and in some high-precision and high-velocity conveying surroundings, magnetic power conveying are generally used, that is, the movers move on stators (that is, a guide rail) by using the magnetic power as a driving force. For conveying sections with low conveying accuracy requirements and no conveying speed control requirements, operating costs will increase if still using magnetic power conveyor lines.

SUMMARY

The disclosure provides a mover and a mixed conveyor line having the mover, to effectively reduce the overall setting cost of a transport line.

One aspect of the disclosure provides a mover, which at least can be applied to a magnetic power conveyor line and a mixed conveyor line. The mover is movable mounted on the magnetic power conveyor line or the mixed conveyor line. The magnetic power conveyor line includes a first armature winding; and the mixed conveyor line includes a first driving mechanism. The mover includes: a mover body, including a first permanent magnet array, the first permanent magnet array including two first permanent magnets which are oppositely spaced apart from each other, and the two first permanent magnets and the first armature winding driving, by current excitation, the mover body to move along the magnetic power conveyor line; and a driven assembly, connected with the mover body, and configured to be in transport connection with the first driving mechanism and drive the mover body to move along the magnetic power conveyor line or the mixed conveyor line.

Further, the mover body includes a connecting portion, which is connected with the first permanent magnet array and the driven assembly. The driven assembly and the first permanent magnet array are located on two opposite sides of the connecting portion.

Further, a transport mode between the driven assembly and the first driving mechanism is at least one of a friction transport, a magnetic adsorption transport, or a fixed contact transport.

Further, the transport mode between the driven assembly and the first driving mechanism is the friction transport. The driven assembly includes: a fixed structure, connected with the mover body; a friction structure, configured to abut against the first driving mechanism and generate frictional resistance; and a tensioning structure, located between the fixed structure and the friction structure, connected with the fixed structure and the friction structure, and configured to tightly bear the friction structure against the first driving mechanism.

Further, the friction structure includes: a friction block, configured to abut against the first driving mechanism and generate frictional resistance; and a fixed block, fixedly connected with the friction block. An orthographic projection of the fixed block on the friction block covers the friction block, and the friction block is arranged on a surface of the fixed structure that is away from the tensioning structure. The tensioning structure includes: a guide rod, where one end of the guide rod is movable connected with the fixed structure, and the other end of the guide rod is fixedly connected with the fixed block; and an elastic member, sleeved on the guide rod, where one end of the elastic member docking against the fixed block, and the other end of the elastic member docking against the fixed structure.

Further, a preparation material of the friction block is at least one of rubber or resin.

Further, there are two groups of the driven assemblies, and two groups of the driven assemblies are located on two opposite sides of the mover body; and the two first permanent magnets, which are oppositely spaced apart from each other, are located between the two groups of driven assemblies.

Further, the first driving mechanism includes a second armature winding. Each of the driven assemblies includes a second permanent magnet array, and the second permanent magnet array comprises at least one second permanent magnet. The second permanent magnet and the second armature winding drive, by current excitation, the mover body to move along the magnetic power conveyor line or the mixed conveyor line.

Further, the mover further includes: a first sliding assembly, arranged on the mover body and configured to be movable mounted on the magnetic power conveyor line; and a second sliding assembly, arranged on the driven assembly, spaced apart from the first sliding assembly, and configured to be movable mounted on the mixed conveyor line. Alternatively, the mover includes: a first sliding assembly, arranged on the mover body, configured to be movable mounted on the magnetic power conveyor line, and spaced apart from the driven assembly.

Further, the mover further includes: a distance sensing apparatus, connected with the mover body and configured to detect a moving position of the mover.

Further, the mover body is provided with an accommodating groove, and the accommodating groove extends in a first preset direction to penetrate two ends of the mover body. The accommodating groove extends in a second preset direction, so as to form, on one side of the mover body, a notch that allows the armature winding to enter and exit the accommodating groove. The second preset direction is perpendicular to the first preset direction. The accommodating groove includes a first groove wall, a second groove wall and a third groove wall. The third groove wall is arranged opposite to the notch. The first groove wall and the second groove wall are arranged opposite to each other, and are respectively located on two sides of the third groove wall. The first permanent magnet includes a first magnetic steel group which is arranged on the first groove wall and a second magnetic steel group which is arranged on the second groove wall. The second magnetic steel group and the first magnetic steel group are arranged opposite to each other and spaced apart from each other. The first magnetic steel group and the second magnetic steel group both include at least one magnet module, which is arranged in the first preset direction. The magnet module is detachable connected with the mover body. The magnet module includes a plurality of sub-magnets, which are arranged in the first preset direction.

Further, permanent magnets in the second magnetic steel group and permanent magnets in the first magnetic steel group are arranged in a one-to-one correspondence; and a magnetization direction of the permanent magnets in the second magnetic steel group is the same as a magnetization direction of a corresponding permanent magnets in the first magnetic steel group.

Further, one or more sub-magnets in the magnet module are arranged in a Halbach array. The magnet module includes a mounting rack, and the mounting rack is detachable connected with the mover body. The plurality of sub-magnets are arranged adjacent to or spaced apart from the mounting rack.

Further, the magnet module includes a first sub-magnet, a second sub-magnet, a third sub-magnet and a fourth sub-magnet, which are arranged in the first preset direction.

Further, a magnetization direction of the first sub-magnet is in a third preset direction, and the third preset direction is perpendicular to the first preset direction and the second preset direction; a magnetization direction of the second sub-magnet is in a fourth preset direction, and the fourth preset direction is parallel to the first preset direction; a magnetization direction of the third sub-magnet is in a fifth preset direction, and the fifth preset direction is opposite to the third preset direction; and a magnetization direction of the fourth sub-magnet is in a sixth preset direction, and the sixth preset direction is opposite to the fourth preset direction.

Further, a plurality of magnet modules of the first magnetic steel group include at least one first magnet module or/and at least one second magnet module. The first sub-magnet, the second sub-magnet, the third sub-magnet and the fourth sub-magnet in the first magnet module are successively arranged in the first preset direction. The second sub-magnet, the first sub-magnet, the fourth sub-magnet and the third sub-magnet in the second magnet module are successively arranged in the first preset direction.

Further, in the first magnetic steel group, a magnetization direction of the permanent magnets located on a first end of the first magnetic steel group is in the third preset direction, and a magnetization direction of the permanent magnets located on a second end of the first magnetic steel group is in the fifth preset direction.

Further, in the first magnetic steel group, in the first preset direction, a magnetization direction of the permanent magnets located on a first end of the first magnetic steel group is in the fourth preset direction, and a magnetization direction of the permanent magnets located on a second end of the first magnetic steel group is in the sixth preset direction.

Further, the plurality of permanent magnets in the magnet module are arranged in a Halbach array. A side of the first magnetic steel group that is close to the second magnetic steel group obtains magnetic field enhancement, and a side of the second magnetic steel group that is close to the first magnetic steel group obtains magnetic field enhancement.

Another aspect of the disclosure provides a mixed conveyor line. The mixed conveyor line includes a magnetic power conveyor line, an auxiliary conveyor line and the mover as provided above. The mover is movable mounted on the magnetic power conveyor line or the auxiliary conveyor line. The magnetic power conveyor line includes a first armature winding and a first guide rail. A first permanent magnet array is mated with the first armature winding to drive the mover to move along the first guide rail. The auxiliary conveyor line includes a first driving mechanism and a second guide rail. A driven assembly is mated with the first driving mechanism to drive the mover to move along the second guide rail.

Further, there are a plurality of movers arranged. Each of the movers includes a buffer member. When the plurality of movers are all mounted on the magnetic power conveyor line or the auxiliary conveyor line, in a moving direction of the movers, buffer members are correspondingly arranged on two opposite sides of mover bodies.

Further, the mixed conveyor line is provided with at least one arc section. At the arc section, the first guide rail and the second guide rail are arranged in a non-collinear manner.

Further, the first driving mechanism includes a transport member and an docking structure. The transport member is in transport connection with the docking structure, so as to drive at least part of the docking structure to move in a guide direction of the second guide rail. The docking structure is configured to be connected with the mover, so as to cause the mover to move along the second guide rail. The auxiliary conveyor line includes a position sensing assembly. The position sensing assembly includes a plurality of position sensors, and a controller electrically connected with the plurality of position sensors. The plurality of position sensors are successively arranged along the second guide rail, and are configured to detect position information of the mover and output the position information to the controller. The controller is configured to adjust, according to the position information, a driving speed of the first driving mechanism to the mover.

Further, each of the plurality of the position sensors includes a signal transmitter and a signal receiver. One of the signal transmitter and the signal receiver is arranged on one side of the second guide rail, and the other one is configured to be connected with the mover. The signal transmitter and the signal receiver are both arranged on the second guide rail. When a signal, from the signal transmitter, received by the signal receiver is changed, the signal receiver outputs the position information of the mover to the controller.

Further, each of the plurality of the position sensors includes at least one of a magnetic grating sensor, an optical grating sensor, an infrared sensor, a color sensor, or a Hall sensor.

Further, the first driving mechanism includes at least one of a friction transport structure, a fixed transport structure or a magnetic transport structure. When the first driving mechanism includes the friction transport structure, the docking structure includes: a synchronous belt, where a conveyor direction of the synchronous belt is parallel to the guide direction of the second guide rail. The transport member includes: two synchronous pulleys, spaced apart from each other; and a support structure, configured to support the synchronous belt. The synchronous belt is connected with peripheral sides of the two synchronous pulleys in a sleeving manner. The support structure is located between the two synchronous pulleys, and is located within a range that is enclosed by the two synchronous pulleys and the synchronous belt. The support structure extends in the conveyor direction of the synchronous belt.

Further, the support structure includes a hard support plate and a soft support plate. The hard support plate and the soft support plate are stacked in a direction perpendicular to a surface of the synchronous belt. The soft support plate is located between the hard support plate and the synchronous belt, and is configured to support a portion of the synchronous belt that drives the mover to move.

Further, the support structure further includes at least two transition members. The two transition members are arranged between the soft support plate and the synchronous belt, and are located on two ends of the soft support plate that are close to the synchronous pulleys.

Further, the first driving mechanism includes at least one of a friction transport structure, a fixed transport structure or a magnetic transport structure. When the first driving mechanism includes the friction transport structure, the docking structure includes: a synchronous belt, where a conveyor direction of the synchronous belt is parallel to the guide direction of the second guide rail. The transport member includes: a synchronous belt, where a conveyor direction of the synchronous belt is parallel to the guide direction of the second guide rail. The transport member includes: a plurality of synchronous pulleys, arranged at intervals. The synchronous belt is connected with peripheral sides of the synchronous pulleys in a sleeving manner.

Further, the magnetic power conveyor line and the auxiliary conveyor line are successively arranged along the second guide rail and are docked with each other. The mover is movable moved, along the second guide rail, between the magnetic power conveyor line and the auxiliary conveyor line.

Further, the first driving mechanism includes: an docking structure that achieves docking by friction transport; or an docking structure that achieves docking by fixed transport; or an docking structure that achieves docking by magnetic transport.

Further, the mover includes: a mover body; and a driven assembly, including a fixed structure and a friction structure. The fixed structure is fixed on the mover body. The friction structure includes a guide rod and an elastic member. One end of the guide rod is movable connected with the fixed structure, and the other end is fixedly connected with the friction structure. The friction structure is configured to be in contact with the synchronous belt and generate a frictional force. The elastic member is sleeved on a peripheral side of the guide rod, and is located between the fixed structure and the friction structure.

Further, the fixed structure is provided with a mounting surface close to the synchronous belt, and the friction structure is provided with a friction surface close to the synchronous belt. The synchronous belt is provided with an internal contact surface and an external contact surface, the internal contact surface is configured to be in contact with the synchronous pulleys, so as to generate frictional resistance between the synchronous belt and the synchronous pulleys, and the external contact surface is arranged opposite to the mounting surface. The friction structure is configured to be in contact with the external contact surface. In a telescoping direction of the elastic member, a distance between the mounting surface and the internal contact surface is $L1$, a distance between the mounting surface and the external contact surface is $L2$, a distance between the mounting surface and the friction surface is $L3$, and a conditional expression: $L1>L3>L2$ is met.

Further, there are a plurality of groups of magnetic power conveyor lines, and there are a plurality of groups of auxiliary conveyor lines. The magnetic power conveyor lines and the auxiliary conveyor lines are successively alternately arranged along the second guide rail.

Further, the mover includes a sliding block, and the sliding block is slidably connected with the second guide rail or the first guide rail. When the auxiliary conveyor lines are docked with the magnetic power conveyor lines, the second guide rail is docked with the first guide rail, and the sliding block is capable of moving between the second guide rail and the first guide rail.

Further, the mixed conveyor line further includes docking assemblies. There are at least two groups of docking assemblies. One docking assembly connects a tail of the magnetic power conveyor line with a head of the auxiliary conveyor line, and another docking assembly connects a head of the magnetic power conveyor line with a tail of the auxiliary conveyor line. The mover is movable connected with the magnetic power conveyor line and the auxiliary conveyor line along the second guide rail.

There are a plurality of groups of magnetic power conveyor lines. There are a plurality of groups of auxiliary conveyor lines, and one of the auxiliary conveyor lines is used as a reflux section. The plurality of groups of magnetic power conveyor lines and the plurality of groups of auxiliary conveyor lines are successively alternately arranged along the second guide rail, so as to form a conveying section. One docking assembly connects a tail of the conveying section with a head of the reflux section, and another docking assembly connects a head of the reflux section with a tail of the conveying section.

By the technical solutions of the disclosure, in addition to being used on the magnetic power conveyor line, the mover may also be transmitted, by the driven assembly and the driving mechanism, on a non-magnetic power conveyor line by other transport modes, such that on a transport line section with low conveying accuracy and no conveying speed requirements, the magnetic power conveyor line may be replaced with the non-magnetic power conveyor line, and the mover in the embodiments of the disclosure may still be used for transportation, thereby reducing the overall setting cost of a transport line.

BRIEF DESCRIPTION OF THE DRAWINGS

The drawings described herein are used to provide a further understanding of the disclosure, and constitute a part of the disclosure. The exemplary embodiments and descriptions of the disclosure are used to explain the disclosure and do not constitute an improper limitation of the disclosure. In the drawings.

Figure 1:
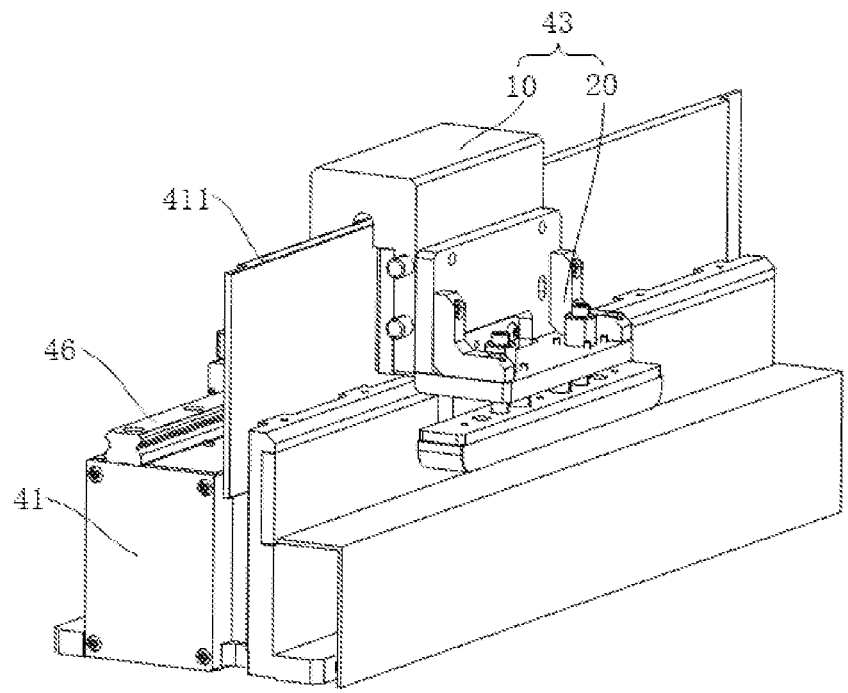
FIG. 1 is a schematic structural diagram of assembling of a mover and a magnetic power conveyor line according to an embodiment of the disclosure.

The above accompanying drawings include the following reference numerals:

10: Mover body; 11: First permanent magnet array; 111: First permanent magnet; 1111: First magnetic steel group; 1112: Second magnetic steel group; 1113: Mounting rack; 11131: Mounting groove; 1114: First sub-magnet; 1115: Second sub-magnet; 1116: Third sub-magnet; 1117: Fourth sub-magnet; 1118: First magnet module; 1119: Second magnet module; 12: Connecting portion; 13: Accommodating groove; 131: Notch; 132: First groove wall; 133: Second groove wall; 134: Third groove wall; 14: First back panel; 15: Second back panel; 16: Connecting plate; 17: Slidable block; 171: Sliding groove;

20: Driven assembly; 21: Fixed structure; 211: Mounting surface; 22: Friction structure; 221: Friction block; 2211: Friction surface; 222: Fixed block; 23: Tensioning structure; 231: Guide rod; 2311: Gear portion; 232: Elastic member; 24: Second permanent magnet array; 241: Second permanent magnet; 25: First driven assembly; 26: Second driven assembly;

31: First sliding assembly; 32: Second sliding assembly; 33: Buffer member; 34: Sliding block;

40: Mixed conveyor line; 41: Magnetic power conveyor line; 411: First armature winding; 412: First guide rail; 42: Auxiliary conveyor line; 421: First driving mechanism; 4211: Transport member; 4212: Synchronous pulley; 4213: Support structure; 42131: Hard support plate; 42132: Soft support plate; 42133: Transition member; 4214: Docking structure; 4215: Synchronous belt; 4216: Internal contact surface; 42161: First internal connecting portion; 42162: Second internal connecting portion; 4217: External contact surface; 422: Second guide rail; 423: Position sensing assembly; 4231: Position sensor; 43: Mover; 44: Arc section; 45: Docking assembly; 451: Docking sliding rail; 452: Docking sliding block; 453: Docking guide rail; 46: Third guide rail;

L1: Distance between a mounting surface and an internal contact surface;

L2: Distance between a mounting surface and an external contact surface;

L3: Distance between a mounting surface and a friction surface;

S: Guide direction.

DETAILED DESCRIPTION OF THE EMBODIMENTS

The technical solutions in the embodiments of the disclosure will be clearly and completely described below in combination with the drawings in the embodiments of the disclosure. It is apparent that the described embodiments are only part of the embodiments of the disclosure, not all the embodiments. The following description of at least one exemplary embodiment is merely illustrative in nature and is never intended to limit the disclosure and application or use thereof in any way. All other embodiments obtained by those of ordinary skill in the art on the basis of the embodiments in the disclosure without creative work all fall within the scope of protection of the disclosure.

In the related art, in some high-precision and high-velocity conveying surroundings, a magnetic power conveyor line is generally used for transportation, that is, movers move on stators (that is, a guide rail) by using magnetic power as a driving force. However, the setting cost of the magnetic power conveyor line is relatively high. Some sections on the transport line only need to play a conveying function, and have low requirements for conveying accuracy and speed. Likewise, if the magnetic power conveyor line is used for transportation (especially in long straight conveying sections where accuracy and speed are not required), the overall purchase cost of the conveyor line is relatively high.

In view of the above situations, in a first aspect, referring to FIG. 1 to FIG. 30, the disclosure provides a mover 43, which at least can be applied to a magnetic power conveyor line 41 and a mixed conveyor line 40. The mover 43 is movable mounted on the magnetic power conveyor line 41 or the mixed conveyor line 40. The magnetic power conveyor line 41 includes a first armature winding 411; and the mixed conveyor line 40 includes a first driving mechanism 421. It is understandable that, the magnetic power conveyor line 41 may be a magnetic power conveyor line 41 which is formed by splicing a plurality of stators. The first armature winding 411 and the mover 43 drive, by current excitation, the mover 43 to move. The mixed conveyor line 40 may push the mover 43 to move by two or more types of dynamic effects. Further, the specific structure of the mixed conveyor line 40 is not limited in the embodiments of the disclosure. For example, the mixed conveyor line 40 may work with other transport modes by magnetic power, such as the combined action between the magnetic power and friction transport, and the combined action between the magnetic power and fixed contact transport. For another example, the driving modes of the mixed conveyor line 40 may all be magnetic drive, but the mixed conveyor line 40 may be magnetically driven in different ways to push the mover 43 to move, such as acting by different ways such as current excitation and traveling wave magnetic fields together or independently.

Referring to FIG. 1 to FIG. 6, the mover 43 includes a mover body 10 and a driven assembly 20. The mover body 10 includes a first permanent magnet array 11; the first permanent magnet array 11 includes two first permanent magnets 111 which are oppositely spaced apart from each other; and the two first permanent magnets 111 and the first armature winding 411 drive, by current excitation, the mover body 10 to move along the magnetic power conveyor line 41. The driven assembly 20 is connected with the mover body 10, and configured to be in transport connection with the first driving mechanism 421 and drive the mover body 10 to move along the magnetic power conveyor line 41 or the mixed conveyor line 40.

Specifically, on the magnetic power conveyor line 41, the first armature winding 411 generates a changing magnetic field by energizing the first armature winding 411, and the first permanent magnet array 11 of the mover body 10 interacts with a magnetic field generated by the first armature winding 411 to generate a driving force, such that the entire mover 43 is pushed to move in an extending direction of the magnetic power conveyor line 41. On the mixed conveyor line 40, the driven assembly 20 of the mover 43 may push the entire mover 43 to move in an extending direction of the mixed conveyor line 40 by the transport of the first driving mechanism 421. The number of the first permanent magnet arrays 11 is not specifically limited in the embodiments of the disclosure. For example, there may be one or more pairs of the first permanent magnet arrays 11. The specific structure of the first driving mechanism 421 is not limited in the embodiments of the disclosure. A specific transport mode of the driven assembly 20 and the first driving mechanism 421 is described in detail below.

It is to be noted that, in the embodiments of the disclosure, through the arrangement of the driven assembly 20, the mover 43 may be applied to different types of transport lines. In addition to being able to be used on the magnetic power conveyor line 41, the mover 43 in the embodiments of the disclosure may also be transmitted on the mixed conveyor line 40 by the driven assembly 20 and the first driving mechanism 421 in other transport modes. It is understandable that, through the arrangement of the driven assembly 20, the mover 43 is characterized by the diversity of transport modes. In one aspect, through the arrangement of the driven assembly 20, the mover 43 may be suitable for different transport lines, such that the universality of the mover 43 is improved; and in another aspect, the universality of the driven assembly 20 may reduce the overall setting cost of the transport lines.

It is to be noted that, for the transport lines, the driven assembly 20 is moved under the driving of the first driving mechanism 421, such that the driven assembly 20 may drive the mover body 10 to move. For the mover body 10, the driven assembly 20 may serve as a driving member to drive the mover body 10 to move.

Figure 3:
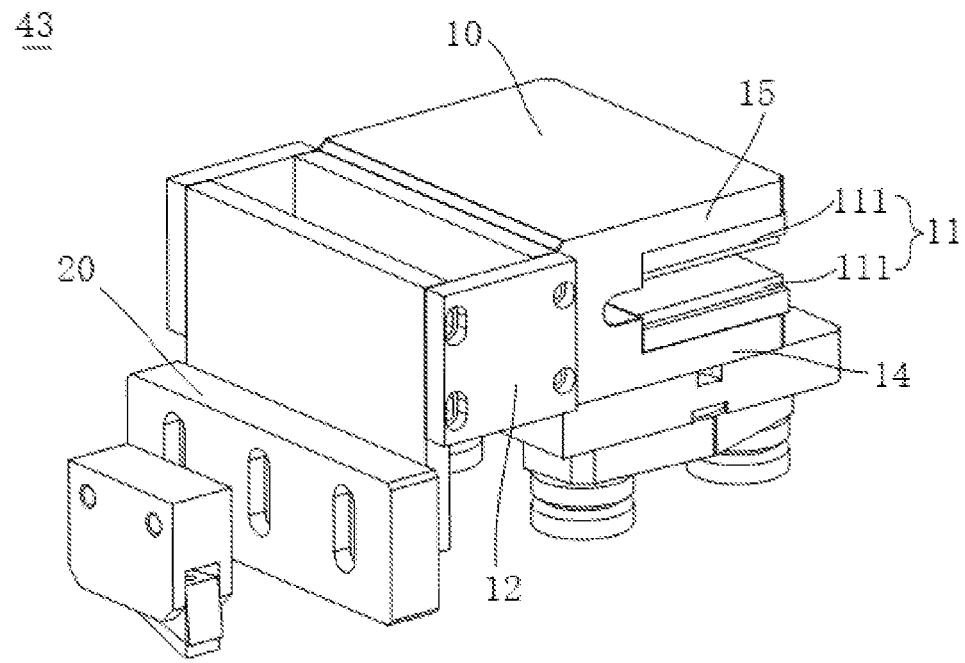
FIG. 3 is a schematic structural diagram of a mover according to an embodiment of the disclosure.
Figure 4:
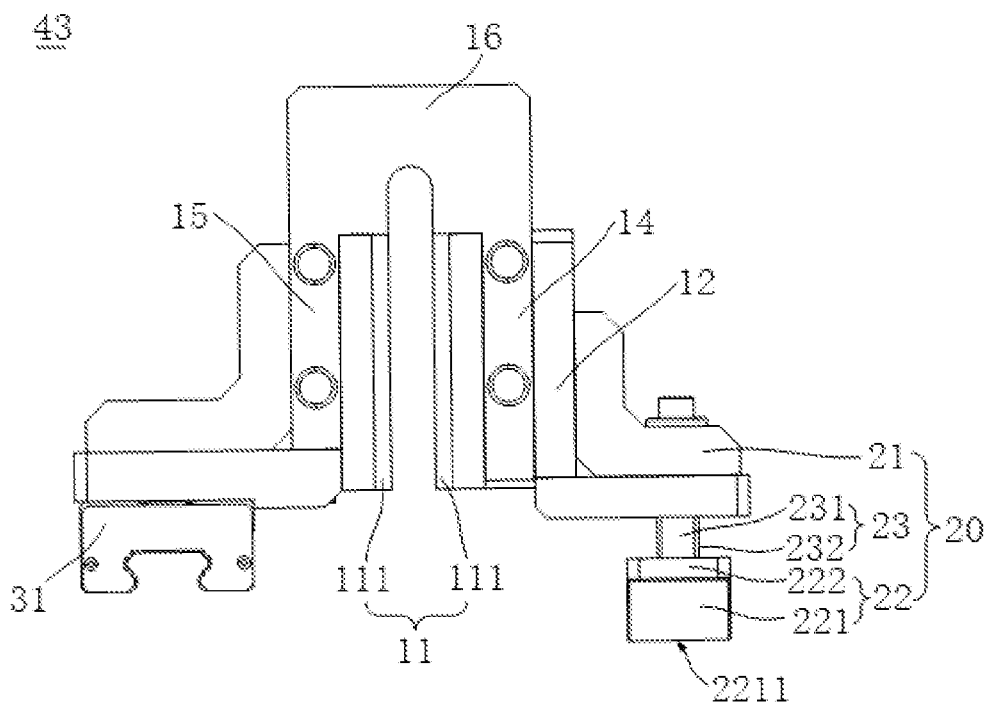
FIG. 4 is a schematic structural diagram of a first viewing angle of a mover according to another embodiment of the disclosure.

It is to be further noted that, referring to FIG. 1, FIG. 3 and FIG. 4, the mover body 10 may further include a first back panel 14, a connecting plate 16 and a second back panel 15. The first back panel 14, the connecting plate 16 and the second back panel 15 may be successively connected; or the first back panel 14, the connecting plate 16 and the second back panel 15 are integrally manufactured. The first back panel 14 and the second back panel 15 are oppositely arranged at intervals. The two first permanent magnets 111 are respectively arranged on the opposite proximity surfaces of the first back panel 14 and the second back panel 15. There is a placement gap between the two first permanent magnets 111, and is configured to place the first armature winding 411. That is to say, when the mover 43 is arranged cooperatively with the magnetic power conveyor line 41, the two first permanent magnets are arranged on two sides of the first armature winding 411. When the first armature winding 411 is energized, the first armature winding 411 generates a changing magnetic field, and the magnetic field and the first permanent magnets are mutually coupled and generate a relative acting force, so as to drive the mover body 10 to move on the magnetic power conveyor line 41. Further, the first back panel 14 and the second back panel 15 may provide a mounting foundation for the two first permanent magnets 111, such that the deviation of the first permanent magnets 111 may be prevented, thereby ensuring the stable running of the mover 43 on the magnetic power conveyor line 41.

It is understandable that, in combination with FIG. 1 and FIG. 4, if the arrangement position of the first armature winding 411 is perpendicular to a horizontal plane, the two first permanent magnets 111 of the mover 43 are both arranged oppositely in a vertical direction, and in this case, a transport material may be carried on the surface of the connecting plate 16 that is away from the two first permanent magnets. As shown in FIG. 3, if the arrangement position of the magnetic power conveyor line 41 is parallel to the horizontal plane, the two first permanent magnets 111 of the mover 43 are both arranged oppositely in a horizontal direction, and in this case, the transport material may be carried on the surface of the first back panel 14 or the second back panel 15 that is away from the first permanent magnets.

In combination with FIG. 1, FIG. 3 and FIG. 4, in some embodiments of the disclosure, the mover body 10 includes a connecting portion 12. The connecting portion 12 is connected with the first permanent magnet array 11 and the driven assembly 20; and the driven assembly 20 and the first permanent magnet array 11 are located on two opposite sides of the connecting portion 12.

It is understandable that, since the first permanent magnet array 11 and the driven assembly 20 are respectively arranged on two opposite sides of the connecting portion 12, the first armature winding 411 cooperated with the first permanent magnet array 11, and the first driving mechanism 421 cooperated with the driven assembly 20 should also be respectively arranged on the two opposite sides of the connecting portion 12. Further, it is understandable that, a moving path of the first permanent magnet array 11 driven by the first armature winding 411, and a moving path of the driven assembly 20 driven by the first driving mechanism 421 are relatively arranged in a non-collinear manner. That is to say, the arrangement of the driven assembly 20 does not interfere with the moving of the mover body 10 driven by the first permanent magnet array 11, such that on the basis of guaranteeing the smooth moving of the mover body 10, the driven assembly 20 may also allow the mover 43 driven in more driving modes.

Figure 14:
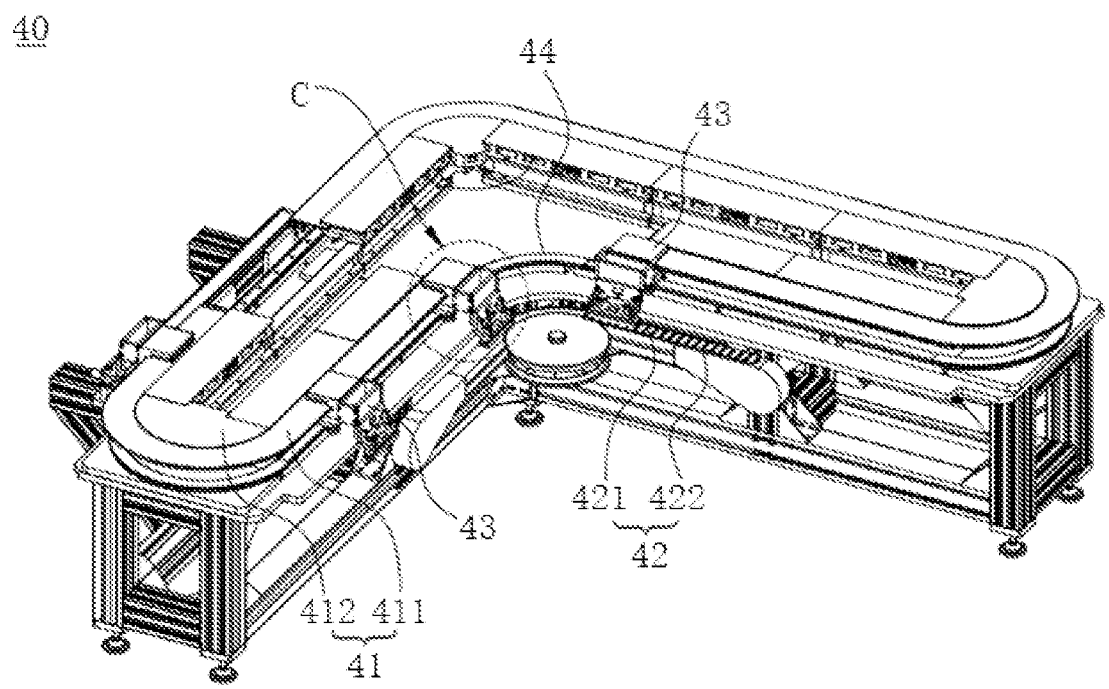
FIG. 14 is a schematic structural diagram of assembling of a plurality of movers and a mixed conveyor line according to an embodiment of the disclosure.

Further, when the magnetic power conveyor line 41 or the mixed conveyor line 40 is provided with an arc section 44 (as shown in FIG. 14), the mover 43 needs to turn at the arc section 44 of the transport line. Since the driven assembly 20 and the first permanent magnet array 11 are arranged on two opposite sides of the connecting portion 12, the first permanent magnet array 11 and the driven assembly 20 have different turning angles/turning radii during turning, such that a moving form of the mover 43 at the arc section 44 may be selected according to actual working condition requirements, that is, whether the mover 43 is driven by using the first permanent magnet array 11 or driven by using the driven assembly 20 during turning may be selected according to the working condition requirements. It is understandable that, in some embodiments, if the driven assembly 20 and the first driving mechanism 421 have a more stable cooperating structure compared with the first permanent magnet array 11 and the first armature winding 411, at the arc section 44, the driven assembly 20 may have a longer moving journey, or the driven assembly 20 may have a larger turning angle, so as to guarantee the moving stability of the mover 43 at the arc section 44. In some embodiments, the driven assembly 20 may have a shorter moving journey, or the driven assembly 20 may have a smaller turning angle, so as to make the mover 43 have a higher moving speed at the arc section 44. In some embodiments, the mover 43 is only mated with one of the first armature winding 411 and the first driving mechanism 421 at the arc section 44, such that the setting cost of a transport line body may be reduced. It is understandable that, in some embodiments, if the driven assembly 20 and the first driving mechanism 421 have a lower setting cost compared with the first permanent magnet array 11 and the first armature winding 411, at a linear section or the arc section 44, the driven assembly 20 may only be arranged to be in transport connection with the first driving mechanism 421, so as to reduce the setting cost of the entire transport line.

In some embodiments of the disclosure, a transport mode between the driven assembly 20 and the first driving mechanism 421 is at least one of a friction transport, a magnetic adsorption transport, or a fixed contact transport. It is understandable that, the driven assembly 20 and the first driving mechanism 421 may be driven either in the above three transport modes only, or in combination with each other.

Figure 2:
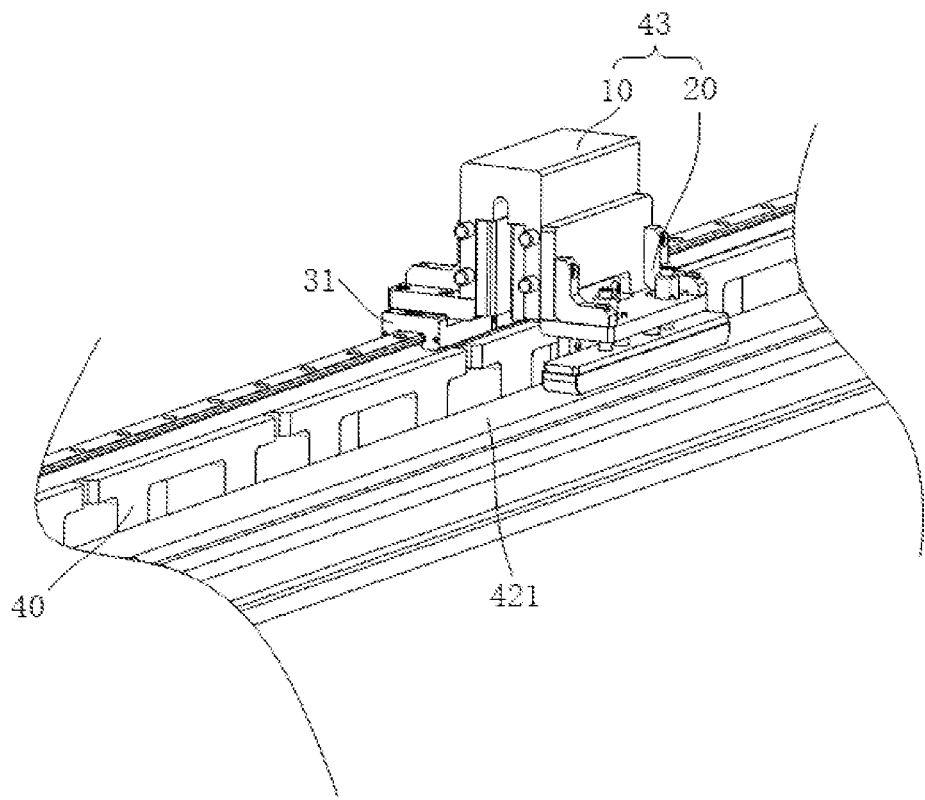
FIG. 2 is a schematic structural diagram of assembling of a mover and a mixed conveyor line according to an embodiment of the disclosure.
Figure 17:
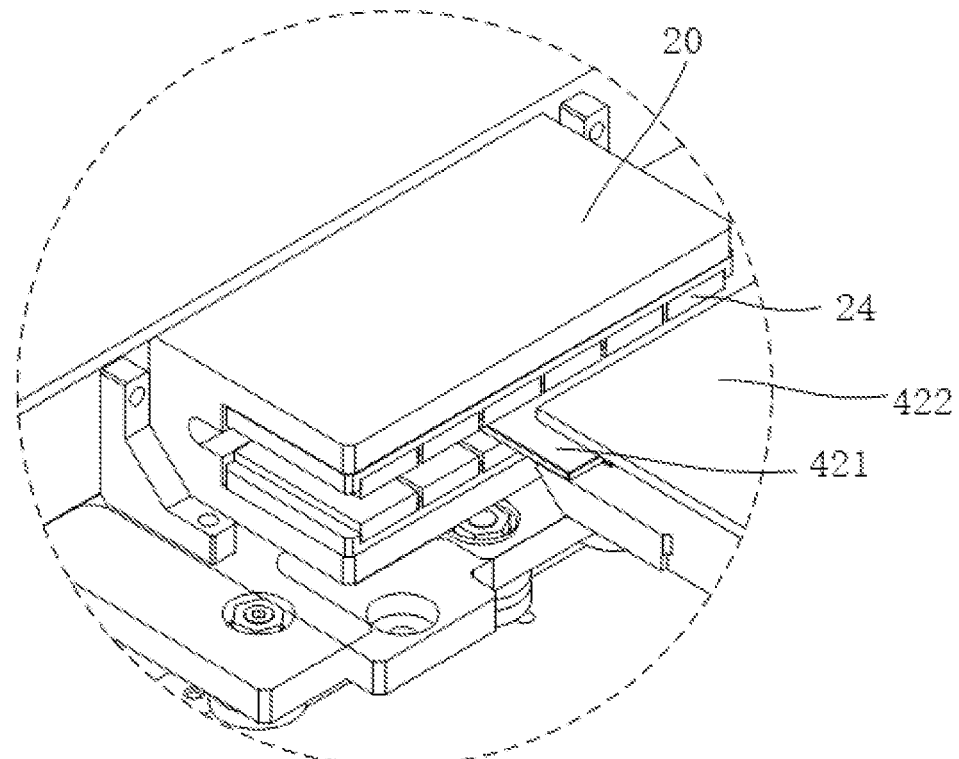
FIG. 17 is a schematic diagram of an enlarged structure of a part D in FIG. 16.

It is to be noted that, the driven assembly 20 and the first driving mechanism 421 may be driven in various transport modes, such that the mover 43 may be applied to different types of transport lines. For example, as shown in FIG. 2 and FIG. 4, the transport mode between the driven assembly 20 and the first driving mechanism 421 being friction transport is used as an example, the first driving mechanism 421 may include a motor and a synchronous belt. The driven assembly 20 may be provided with a friction block 221. The motor is configured to drive the synchronous belt to move. The friction block 221 on the driven assembly 20 is frictionally mated with the synchronous belt, such that the moving of the synchronous belt may drive the friction block 221 to move, so as to drive the mover 43 to move. For another example, the transport mode between the driven assembly 20 and the first driving mechanism 421 being magnetic adsorption transport (as shown in FIG. 17) is used as an example, the driven assembly 20 may be provided with a permanent magnet; the first driving mechanism 421 may include a traveling wave magnetic field; the peaks of the permanent magnet and the traveling wave magnetic field are mutually coupled; and the moving of the peak of the traveling wave magnetic field may generate electromagnetic thrust to drive the permanent magnet on the driven assembly 20 to move, so as to drive the driven assembly 20 and the mover body 10 to move. Alternatively, the first driving mechanism 421 may further include a three-phase alternating-current coil; and the three-phase alternating-current coil is energized, and is coupled to the permanent magnet under current excitation to generate a driving force, so as to drive the driven assembly 20 and the mover body 10 to move. For still another example, the transport mode between the driven assembly 20 and the first driving mechanism 421 being fixed contact transport is used as an example, the first driving mechanism 421 may include a rotary disk and a plurality of conveying blocks; the plurality of conveying blocks are arranged in a rotationally symmetrical manner relative to the shaft of the rotary disk; and the rotary disk rotates around the shaft, so as to drive the conveying blocks to move. The driven assembly 20 is provided with a shifting fork; when the shifting fork runs to a friction disk, the friction disk rotates to cause the conveying blocks to abut against and engage with the shifting fork; and the shifting fork moves with the rotation of the conveying blocks, so as to drive the mover 43 to move. For yet another example, the transport mode between the driven assembly 20 and the first driving mechanism 421 being fixed contact transport is used as an example, the first driving mechanism 421 may include a motor and a rack; the driven assembly 20 may be provided with a tooth slot or a gear; the motor is configured to drive the rack to move; and the tooth slot or the gear on the driven assembly 20 is mated with the rack, such that the rack may drive the mover 43 to move. Alternatively, the first driving mechanism 421 may further include a motor and a clamping groove; the driven assembly 20 may be provided with a buckle, and the buckle is inserted into the clamping groove; and the clamping groove is driven to move by the motor, so as to cause the driven assembly 20 and the mover body 10 to move.

Referring to FIGS. 2-4, in some embodiments of the disclosure, the transport mode between the driven assembly 20 and the first driving mechanism 421 is friction transport. The driven assembly 20 includes a fixed structure 21, a friction structure 22 and a tensioning structure 23. The fixed structure 21 is connected with the mover body 10. The friction structure 22 is configured to abut against the first driving mechanism 421 and generate frictional resistance. The tensioning structure is located between the fixed structure 21 and the friction structure 22, connecting the fixed structure 21 and the friction structure 22, and configured to tightly bear the friction structure 22 against the first driving mechanism 421.

It is to be noted that, when the driven assembly 20 is in transport connection with the first driving mechanism 421, the tensioning structure 23 between the fixed structure 21 and the friction structure 22 is in a compressed state, such that the tensioning structure 23 generates an elastic force between the fixed structure 21 and the friction structure 22, to cause the friction structure 22 to abut against the first driving mechanism 421 more closely; and when the first driving mechanism 421 moves, frictional resistance is generated between the friction structure 22 and the first driving mechanism 421, such that the first driving mechanism 421 may drive the driven assembly 20 and the mover body 10 to move on the mixed conveyor line 40.

Specifically, the fixed structure 21 is fixedly connected with the mover body 10, such that, when the driven assembly 20 drives the mover 43 to move, a position relationship between the driven assembly 20 and the mover body 10 is more stable. In the embodiments of the disclosure, a connection mode between the fixed structure 21 and the mover body 10 is not limited; and the specific connection mode between the fixed structure 21 and the mover body 10 includes, but is not limited to, screwing connection, clamping connection or integral forming.

Further, as shown in FIG. 4, the friction structure 22 includes a friction block 221 and a fixed block 222. The friction block 221 is configured to abut against the first driving mechanism 421 and generate frictional resistance. The fixed block 222 is fixedly connected with the friction block 221; and an orthographic projection of the fixed block 222 on the friction block 221 covers the friction block 221; and the friction block 221 is arranged on a surface of the fixed structure 222 that is away from the tensioning structure 23.

It is understandable that, the specific material of the friction block 221 is not limited in the embodiments of the disclosure. A preparation material of the friction block 221 may be at least one of rubber or resin; or the preparation material of the friction block 221 may be a mixed material of the rubber and the resin. Further, the rubber material and the resin material have a high friction coefficient, such that more stable friction transport is achieved between the friction block 221 and the first driving mechanism 421; and the rubber material and the resin material have good elasticity and shock absorption, such that the friction block 221 has longer service life.

It is understandable that, the friction block 221 is provided with a friction surface 2211, which is in contact with the first driving mechanism 421. A connection part between the friction surface 2211 and the surface on a peripheral side of the friction surface may be designed as an arc surface, so as to prevent the friction structure 22 from damaging the first driving mechanism 421 due to scratching.

Further, the fixed block 222 is fixedly connected with the friction block 221, so as to provide an arrangement foundation for the friction block 221. In the embodiments of the disclosure, a connection mode between the fixed block 222 and the friction block 221 is not limited; and the connection mode may be at least one of screwing connection, bonding connection or clamping connection. It is understandable that, during the process of friction transport between the friction block 221 and the first driving mechanism 421, in a moving direction of the mover 43, the front end of the friction block 221 in the moving direction is first in friction connection with the first driving mechanism 421, and the rear end of the friction block 221 in the moving direction is then in friction connection with the first driving mechanism 421. In the embodiments of the disclosure, by designing the orthographic projection of the fixed block 222 on the friction block 221 to cover the friction block 221, when the friction block 221 is in frictional contact with the first driving mechanism 421, the fixed block 222 may completely cover the friction block 221, such that the elastic force of the friction block 221 may be distributed on the fixed block 222 more uniformly, and the friction block 221 is prevented from deforming during long-term use, thereby prolonging the service life of the friction block 221.

It is understandable that, when the magnetic power conveyor line 41 or the mixed conveyor line 40 is provided with an arc section 44 (as shown in FIG. 14), the mover 43 needs to turn at the arc section 44 of the transport line. Since the friction block 221 and the first permanent magnet array 11 are arranged at intervals, the friction block 221 and the first permanent magnet array 11 have different turning angles/turning radii during turning, such that a moving form of the mover 43 at the arc section 44 may be selected according to actual working condition requirements, that is, whether the mover 43 is driven by using the first permanent magnet array 11 or driven by using the friction block 221 during turning may be selected according to the working condition requirements. In this embodiment, a selection driving mode of selecting, at the arc section 44, the first permanent magnet array 11 for driving or using the friction block 221 for driving is the same as a selection driving mode in the above of selecting, at the arc section 44, the first permanent magnet array 11 for driving or using the driven assembly 20 for driving, which is not described again in this embodiment.

Referring to FIGS. 2-4, the tensioning structure 23 includes a guide rod 231 and an elastic member 232. One end of the guide rod 231 is movable connected with the fixed structure 21, and another end of the guide rod 231 is fixedly connected with the fixed block 222. The elastic member 232 is sleeved on the guide rod 231. One end of the elastic member 232 docking against the fixed block, and another end of the elastic member 232 docking against the fixed structure 21. In the embodiments of the disclosure, the specific type of the elastic member 232 is not limited. For example, the elastic member 232 may be an elastic piece, a spring or a spring tube.

In some embodiments, the fixed structure 21 is provided with a guide hole that allows the guide rod 231 to penetrate; and the guide rod 231 may move in the guide hole in a telescoping direction of the elastic member 232. Further, the elastic member 232 being a spring is used as an example, the guide rod 231 may relatively move in the guide rod. When the friction block 221 and the first driving mechanism 421 are in friction transport, the spring produces compression deformation, and the friction structure 22 bears against the first driving mechanism 421. In order to avoid the deviation of the moving direction and arrangement position of the spring, in the embodiments of the disclosure, by arranging the guide rod 231 between the fixed structure 21 and the friction structure 22, and sleeving the spring on the guide rod 231, the spring can only telescope and move in an axial direction of the guide rod 231, such that the position of the spring is prevented from deviating in other directions. By using the process of strengthening a compression state of the spring as an example, in the process of further strengthening the compression state of the spring, the guide rod 231 moves relative to the fixed structure 21, the spring is further compressed, and the elastic force of the spring is applied to the fixed structure 21 and the fixed block 222, so as to bear the friction block 221 against the first driving mechanism 421. In the embodiments of the disclosure, the preparation material of the guide rod 231 is not limited. For example, the preparation material of the guide rod 231 may be metal, wood or hard plastic, etc.

Figure 5:
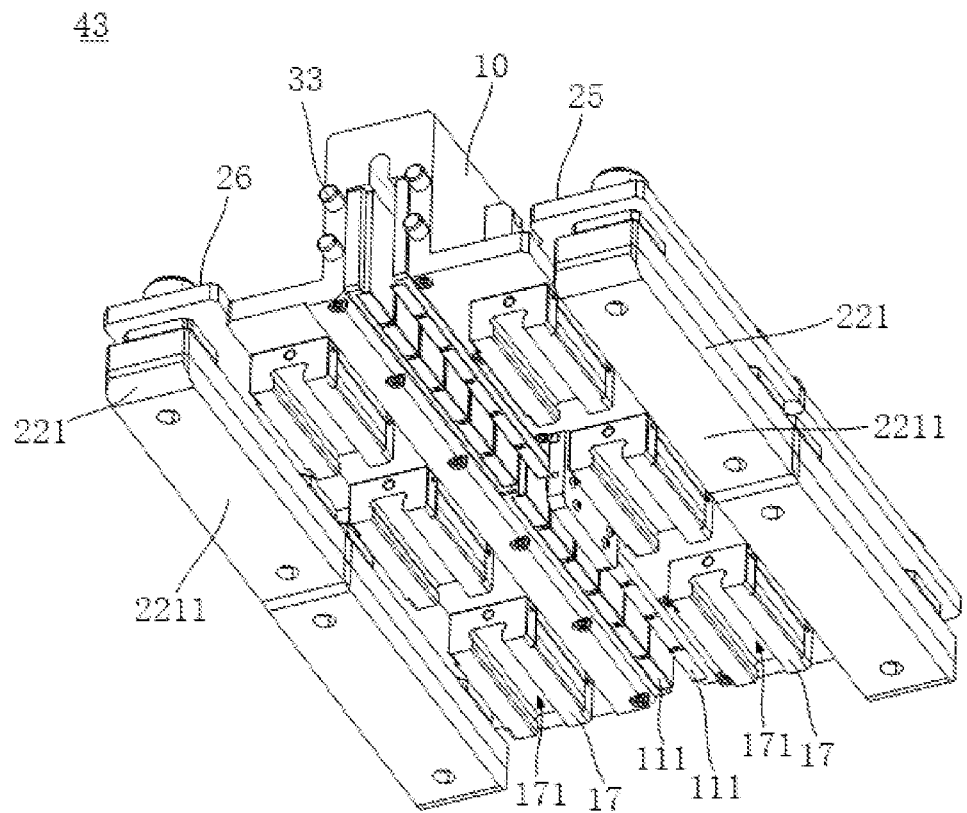
FIG. 5 is a schematic structural diagram of a mover according to still another embodiment of the disclosure.

Referring to FIG. 5, in some embodiments of the disclosure, there are two groups of driven assemblies 20, and two groups of the driven assemblies 20 are located on two opposite sides of the mover body 10; and the two first permanent magnets 111, which are oppositely spaced apart from each other, are located between the two groups of driven assemblies 20. In the embodiments of the disclosure, the specific transport modes of the two groups of driven assemblies 20 are not limited. The two groups of driven assemblies 20 may either have the same transport mode or different transport modes; and the transport modes of the two groups of driven assemblies 20 should be at least one of friction transport, magnetic adsorption transport, or fixed contact transport. Further, when the transport modes of the two groups of driven assemblies 20 are the same, the two groups of driven assemblies 20 may either have the same arrangement structure or different arrangement structures. For example, when the transport modes of the two groups of driven assemblies are both friction transport, the preparation material of the friction block 221 in one group of driven assemblies 20 may be rubber, and the preparation material of the friction block 221 in another group of driven assemblies 20 may be resin. For another example, when the transport modes of the two groups of driven assemblies 20 are both magnetic adsorption transport, one group of driven assemblies 20 may be in transport connection with the first driving mechanism 421 by a traveling wave magnetic field; and another group of driven assemblies 20 may be in transport connection with the first driving mechanism 421 by a three-phase armature winding.

It is understandable that, the two groups of driven assemblies 20 are located on two opposite sides of the mover body 10, such that the mover 43 may be more stable during running. In addition, the two groups of driven assemblies 20 may both be in transport connection with the first driving mechanism 421. Compared with one group of driven assemblies 20, the mover 43 having two groups of driven assemblies 20 is equivalent to the mover 43 having two driving forces, such that the transportation efficiency of the mover 43 is higher.

Further, since the two groups of driven assemblies 20 are respectively arranged on two opposite sides of the mover body 10, it is understandable that, the driven assembly 20 arranged on one side of the mover body 10 is called a first driven assembly 25, and the driven assembly 20 arranged on another side of the mover body 10 is called a second driven assembly 26. That is to say, the first driven assembly 25 and the first permanent magnet array 11 are arranged at intervals, and the second driven assembly 26, the first driven assembly 25 and the first permanent magnet array 11 are arranged at intervals. When the magnetic power conveyor line 41 or the mixed conveyor line 40 is provided with the arc section 44, the mover 43 needs to turn at the arc section 44 of the transport line. Since the two groups of driven assemblies 20 are respectively arranged on two opposite sides of the mover body 10, the first permanent magnet array 11, the first driven assembly 25 and the second driven assembly 26 have different turning angles/turning radii during turning, such that the mover 43 may select a moving form of the mover 43 at the arc section 44 according to actual working condition requirements, that is, whether the mover 43 is driven by using the first permanent magnet array 11 or driven by using the first driven assembly 25, or driven by using the second driven assembly 26 during turning may be selected according to the working condition requirements. It is understandable that, a selection mode of the moving form of the first driven assembly 25 at the arc section 44 in this embodiment of the disclosure is the same as a selection mode of the moving form of the driven assembly 20 at the arc section 44 (as shown in FIG. 14) in the above, and a selection mode of the moving form of the second driven assembly 26 at the arc section 44 in this embodiment of the disclosure is the same as the selection mode of the moving form of the driven assembly 20 at the arc section 44 in the above, such that details are not described herein again.

It is to be noted that, as shown in FIG. 5, in some embodiments, the two opposite sides of the mover body 10 are respectively provided with the driven assemblies 20. In addition, the two sides of the mover body 10 may also respectively provided with slidable blocks 17 with sliding grooves 171, and the sliding grooves 171 on the slidable blocks 17 may be mated with a third guide rail 46 (as shown in FIG. 1) on the transport line, such that the mover 43 is guided to move in an extending direction of the transport line; and the mover 43 may be mounted on the third guide rail 46 of the transport line by the sliding grooves 171, so as to cause the slidable blocks 17 to play a role of supporting the mover 43.

Figure 6:
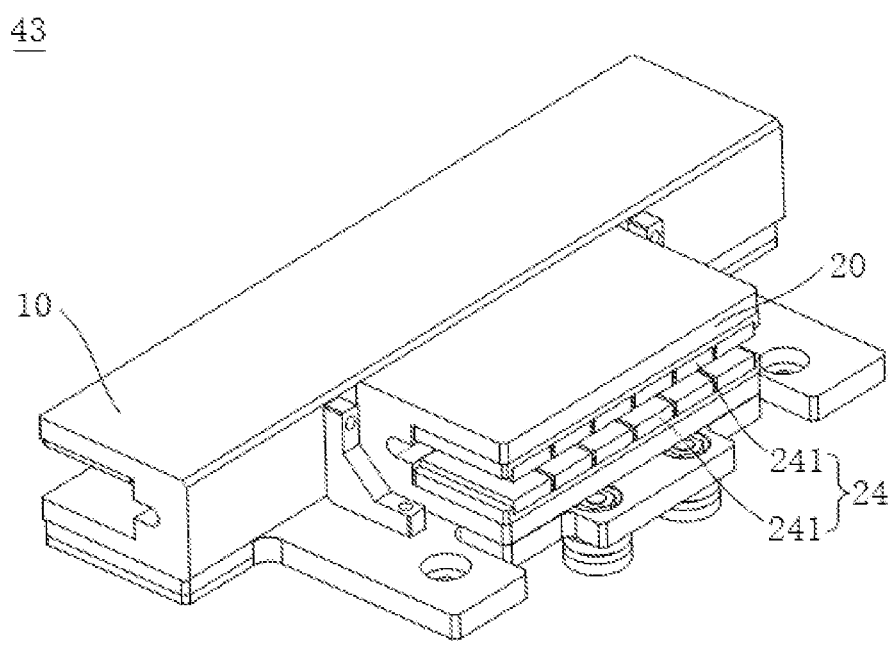
FIG. 6 is a schematic structural diagram of a first viewing angle of a mover according to yet another embodiment of the disclosure.
Figure 7:
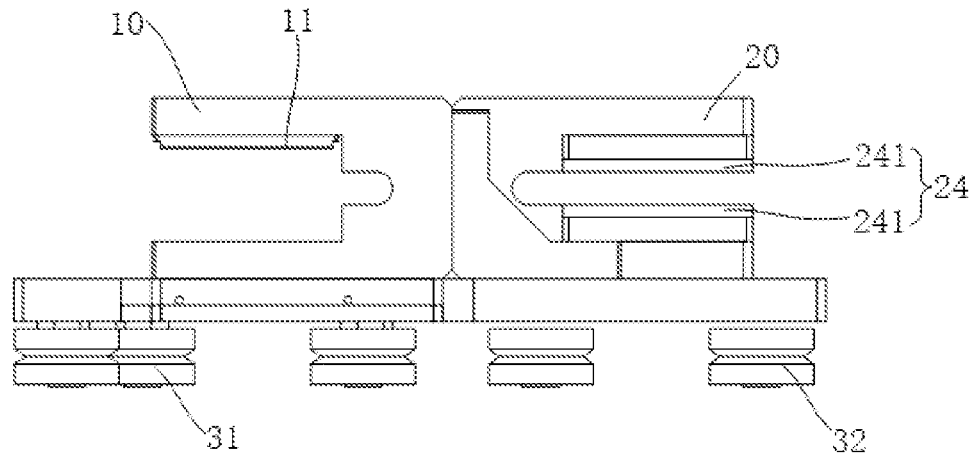
FIG. 7 is a schematic structural diagram of a second viewing angle of a mover according to yet another embodiment of the disclosure.

Referring to FIGS. 6-7, in some embodiments of the disclosure, the mover 43 further includes a first sliding assembly 31 and a second sliding assembly 32. The first sliding assembly 31 is arranged on the mover body 10 and configured to be movable mounted on the magnetic power conveyor line 41. The second sliding assembly 32 is arranged on the driven assembly 20, spaced apart from the first sliding assembly 31, and configured to be movable mounted on the mixed conveyor line 40.

It is understandable that, the first sliding assembly 31 and the second sliding assembly 32 play a role of supporting, guiding and limiting the moving of the mover 43, such that the mover 43 still maintains stable during running. The mixed conveyor line 40 or the magnetic power conveyor line 41 may include the third guide rail 46; and the first sliding assembly 31 and the second sliding assembly 32 may be mated with the third guide rail 46 at different positions, and move along the third guide rail 46, so as to play a role of guiding the moving of the mover 43.

Further, when the magnetic power conveyor line 41 or the mixed conveyor line 40 is provided with an arc section 44 (as shown in FIG. 14), the mover 43 needs to turn at the arc section 44 of the transport line. Since the first sliding assembly 31 and the second sliding assembly 32 are directly cooperated with the guide rail, and the first sliding assembly 31 and the second sliding assembly 32 are arranged on two sides of the first permanent magnet array 11, the first sliding assembly 31 and the second sliding assembly 32 have different turning angles/turning radii during turning, such that the moving form of the mover 43 at the arc section 44 may be selected according to actual working condition requirements, that is, whether the mover 43 is driven by using the first sliding assembly 31 or driven by using the second sliding assembly 32 during turning may be selected according to the working condition requirements. A selection mode of the first sliding assembly and/or the second sliding assembly 32 is the same as the selection mode in the above of using the first permanent magnet array 11 to drive the mover 43 or using the driven assembly 20 to drive the mover during turning, such that details are not described herein again.

In the embodiments of the disclosure, the specific types of the first sliding assembly 31 and the second sliding assembly 32 are not limited. The first sliding assembly 31 may either have the same arrangement structure or different arrangement structures. For example, as shown in FIG. 5, the first sliding assembly 31 and/or the second sliding assembly 32 may include a sliding block with a sliding groove. The sliding groove is configured to accommodate the third guide rail 46. When the mover 43 moves, the sliding block may be driven to move along the third guide rail 46. For another example, as shown in FIG. 7, the first sliding assembly 31 and/or the second sliding assembly 32 may include a slidable roller. The slidable roller is configured to roll along the third guide rail 46. When the mover 43 moves, the slidable roller may be driven to roll along the third guide rail 46. Definitely, the first sliding assembly 31 and/or the second sliding assembly 32 may also simultaneously include the sliding block with the sliding groove, and the slidable roller. When the mover 43 moves, the sliding block moves along the third guide rail 46, and the slidable roller rolls along the third guide rail 46 at the same time. For another example, the first sliding assembly 31 and/or the second sliding assembly 32 may include a sliding block with a ball. When the mover 43 moves, the ball may be driven to roll on the third guide rail 46, so as to drive the sliding block to move along the third guide rail 46.

In some embodiments, the mover 43 includes a first sliding assembly 31. The first sliding assembly 31 is arranged on the mover body 10, and is configured to be movable mounted on the magnetic power conveyor line 41. The first sliding assembly 31 and the driven assembly 20 are arranged at intervals. The first sliding assembly 31 in the embodiments of the disclosure is the same as the first sliding assembly 31 in the above, such that details are not described herein again.

It is understandable that, in this embodiment, the first permanent magnet array 11 on the mover body 10 interacts with the first armature winding 411 by current excitation, and the first sliding assembly 31 on the mover body 10 drives, under an interaction force (that is, magnetic drive), the mover 43 to move along the guide rail. The driven assembly 20 and the first driving mechanism 421 are in transport connection, such that the mover 43 is driven, with the driving of the first driving mechanism 421, to move along the guide rail. Further, when the magnetic power conveyor line 41 or the mixed conveyor line 40 is provided with an arc section 44, the mover 43 needs to turn at the arc section 44 of the transport line. Since the first sliding assembly 31 and the driven assembly 20 are arranged at intervals, the first sliding assembly 31 and the driven assembly 20 have different turning angles/turning radii during turning, such that the moving form of the mover 43 at the arc section 44 may be selected according to actual working condition requirements, that is, whether the mover 43 is driven by using the first sliding assembly 31 or driven by using the driven assembly 20 during turning may be selected according to the working condition requirements. The selection mode in this embodiment of driving via the first sliding assembly 31 or driving via the driven assembly 20 is the same as the selection mode in the above of using the first permanent magnet array 11 to drive the mover 43 or using the driven assembly 20 to drive the mover during turning, such that details are not described herein again.

Continuously referring to FIGS. 6-7, in some embodiments of the disclosure, the first driving mechanism 421 includes a second armature winding (not shown in the figure). Each driven assemblies 20 includes a second permanent magnet array 24, and the second permanent magnet array 24 includes at least one second permanent magnet 241. The second permanent magnet 241 and the second armature winding drive, by current excitation, the mover body 10 to move along the magnetic power conveyor line 41 or the mixed conveyor line 40.

It is to be noted that, when the transport between the driven assembly 20 and the first driving mechanism 421 is magnetic adsorption transport, the second permanent magnet array 24 in the driven assembly 20 is coupled to the second armature winding in the first driving mechanism 421, such that the mover body 10 is driven to move along the magnetic power conveyor line 41 or the mixed conveyor line 40. There may be one or more second permanent magnets 241.

It is to be further noted that, for example, the first armature winding 411 generates a traveling wave magnetic field, and the moving of the peak of the traveling wave magnetic field may generate electromagnetic thrust to drive the second permanent magnet array 24 to move, so as to drive the driven assembly 20 and the mover body 10 to move. For example, the first armature winding 411 is a three-phase alternating-current coil, the three-phase alternating-current coil is energized and generates a driving force under an exciting current, so as to drive the second permanent magnet array 24 to move, thereby driving the driven assembly 20 and the mover body 10 to move.

Further, in some embodiments of the disclosure, the mover 43 further includes a distance sensing apparatus (not shown in the figure). The distance sensing apparatus is connected with the mover body 10, is mated with the magnetic power conveyor line 41 or the mixed conveyor line 40, and is configured to detect a moving position of the mover 43.

It is to be noted that, the distance sensing apparatus may detect the moving position of the mover 43, such that a moving speed of the mover 43 may be calculated according to moving time of the mover 43 and a moving distance of the mover 43. The type and arrangement position of the position sensing apparatus are not specifically limited in the embodiments of the disclosure. For example, the magnetic power conveyor line 41 or the mixed conveyor line 40 is provided with a reflective strip. The distance sensor is an infrared sensor. The infrared sensor may emit an infrared ray; and an initial position of the mover 43 in this case is learned by the infrared ray reflected by the reflective strip. After the mover 43 moves a certain distance, the moving distance of the mover 43 may be obtained by the infrared sensor. For another example, the distance sensor is an ultrasonic sensor, and the ultrasonic sensor emits an ultrasonic wave; and the initial position of the mover 43 in this case is learned by the ultrasonic wave reflected by the reflective strip. After the mover 43 moves a certain distance, the moving distance of the mover 43 may be obtained by the ultrasonic sensor.

The disclosure provides a mover and a mixed conveyor line, to solve the problem that in a mixed conveyor line driven by using magnetic power as power, when being required to take on a larger load, a mover needs often to be replaced to adapt to a different load.

Figure 8:
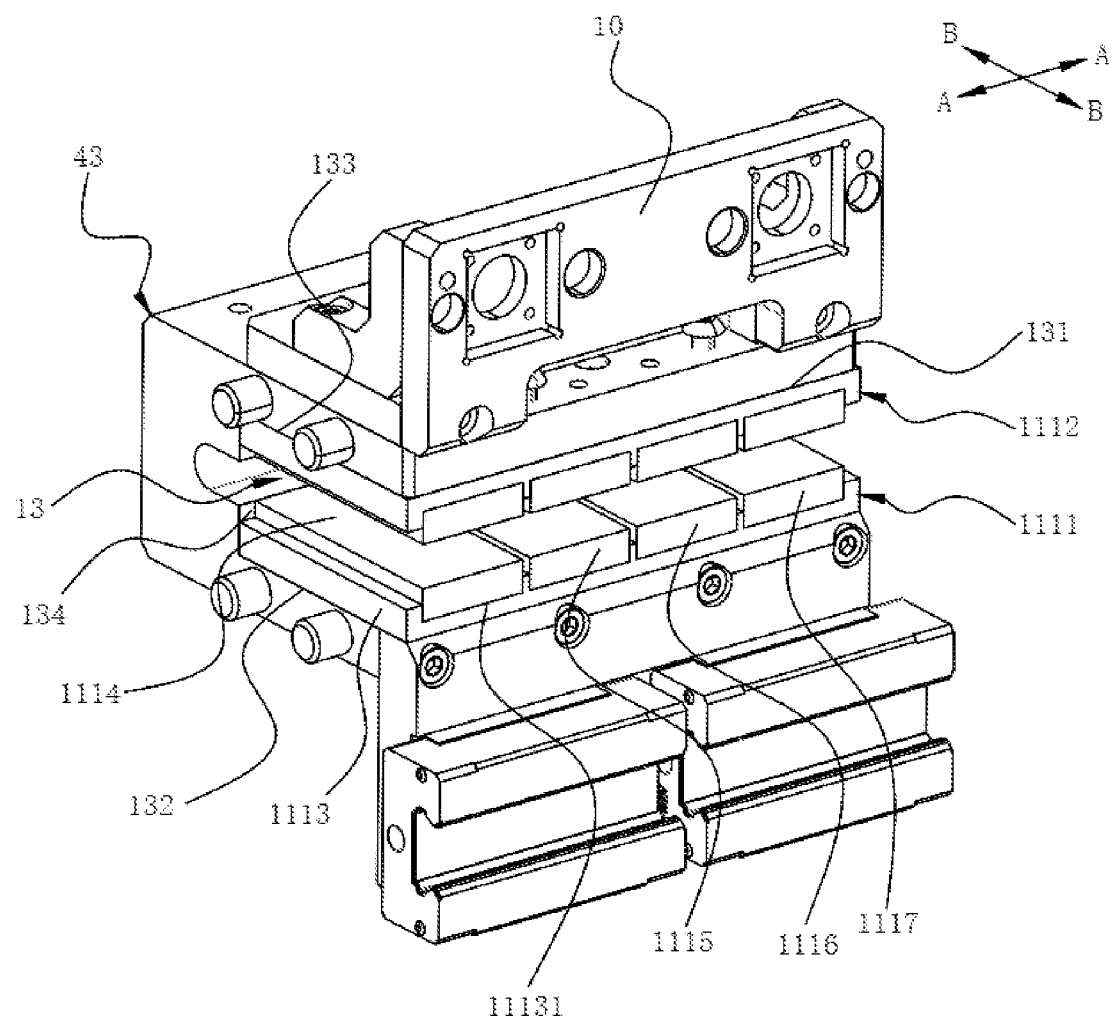
FIG. 8 is a schematic structural diagram of a second viewing angle of a mover according to another embodiment of the disclosure.
Figure 18:
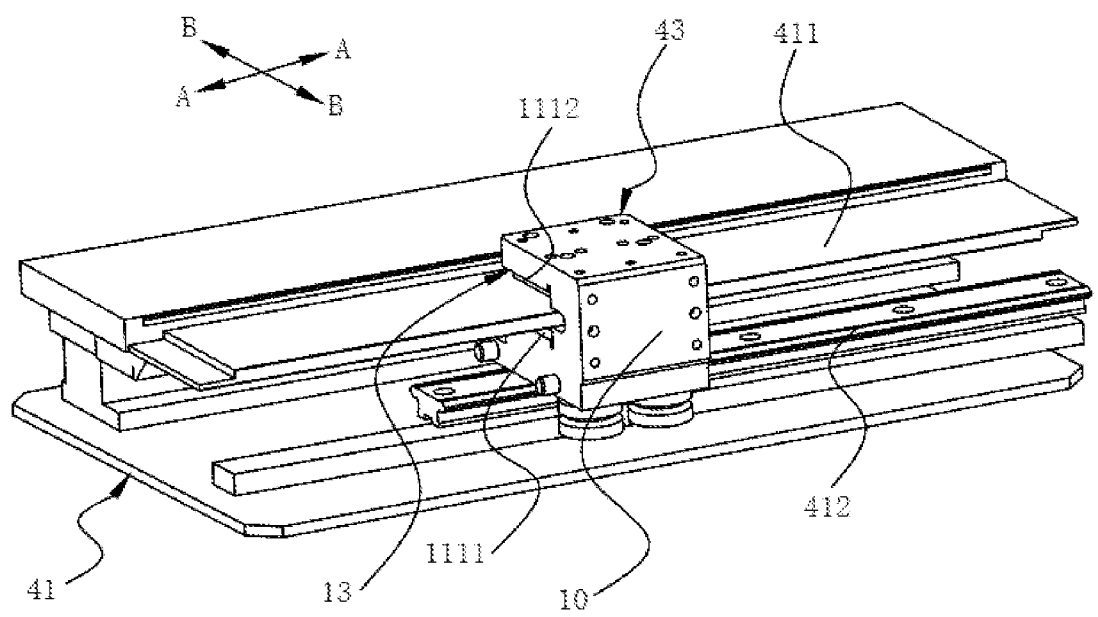
FIG. 18 is a schematic structural diagram of a mixed conveyor line according to an embodiment of the disclosure.

The disclosure provides a mover. As shown in FIG. 8 and FIG. 18, the mover 43 includes a mover body 10 and a first magnetic steel group 1111.

The mover body 10 is provided with an accommodating groove 13, and the accommodating groove 13 extends in a first preset direction AA to penetrate two ends of the mover body 10. The accommodating groove 13 extends in a second preset direction BB, so as to form, on one side of the mover body 10, a notch 131 that allows the first armature winding 411 to enter and exit the accommodating groove 13. The second preset direction BB is perpendicular to the first preset direction AA. The accommodating groove 13 includes a first groove wall 132, a second groove wall 133 and a third groove wall 134. The third groove wall 134 is arranged opposite to the notch 131. The first groove wall 132 and the second groove wall 133 are arranged opposite to each other, and are respectively located on two sides of the third groove wall 134. The first magnetic steel group 1111 is arranged on the first groove wall 132, and includes at least one magnet module, which is arranged in the first preset direction AA. The magnet module is detachable connected with the mover body 10. The magnet module includes a plurality of sub-magnets, which are arranged in the first preset direction AA.

It is to be noted that, the mover 43 is configured to carry an object to be transported. The mover 43 is a magnetic power mover 43. Referring to FIG. 18, during operation, the mover 43 may be placed on the magnetic power conveyor line 41. Using FIG. 18 as an example, the first preset direction AA is parallel to a length extending direction of the magnetic power conveyor line 41; and the second preset direction BB is parallel to a width extending direction of the magnetic power conveyor line 41.

The magnetic power conveyor line 41 is provided with the first armature winding 411. The first armature winding 411 is inserted into the accommodating groove 13 by the notch 131 in the second preset direction BB. The first armature winding 411 is provided with a coil (not shown in the figure). The coil generates a magnetic field when being energized. The first magnetic steel group 1111 of the mover 43 generates a driving force under the current excitation of the coil, so as to push the entire mover 43 to move in the extending direction of the first armature winding 411, such that the transportation of the object to be transported is realized. A specific working principle of the magnetic power conveyor line 41 has been announced in the related art, and the disclosure is not described again thereto.

It is to be further noted that, on the basis of a constant current in the coil, the magnetic field generated by the first magnetic steel group 1111 is stronger, such that the magnetic force of the first magnetic steel group 1111 is stronger. When the coil is energized, the mover 43 may obtain a greater driving force, such that the load that may be carried by the mover 43 is greater. In the embodiments of the disclosure, the magnet module is detachable arranged on the first groove wall 132; and the magnetic force of the first magnetic steel group 1111 is changed by changing the number of the magnet modules in the first magnetic steel group 1111. When the mover 43 is required to carry a greater load, the magnetic force of the first magnetic steel group 1111 may be increased by only increasing the number of the magnet modules, such that the load capacity of mover 43 is improved, without replacing the mover 43 to adapt different loads.

The magnet module may be detachable connected with the mover body 10 by connection modes such as threaded connection, buckling connection and bonding connection. There may be 1, 2 or more magnet modules in the first magnetic steel group 1111. The number of the magnet modules may be selected according to load requirements of the mover 43.

In an embodiment of the disclosure, a plurality of sub-magnets in the magnet module are arranged in a Halbach array. It is understandable that, the Halbach array is of a magnet structure, which may use a small number of sub-magnets to generate a stronger magnetic field. The Halbach array may converge magnetic lines of force on one sides of the magnets, and weaken the magnetic lines of force on another sides of the magnets, such that the strength of the magnetic field generated by the magnet module is enhanced while the number of the sub-magnets in the magnet module remains unchanged, so as to obtain an ideal unilateral magnetic field. The specific principle of the Halbach array has been announced in the related art, and the disclosure is not described again thereto. It is understandable that, the side of the Halbach array where the magnetic lines of force are denser should be arranged close to the coil, so as to further make the mover 43 to obtain a larger driving force.

Continuously referring to FIG. 8 and FIG. 18, in an embodiment of the disclosure, the magnet module further includes a mounting rack 1113. The mounting rack 1113 is detachable connected with the mover body 10. The detachable connection mode between the mounting rack 1113 and the mover body 10 includes, but is not limited to, at least one of screwing connection, bonding connection or clamping connection. It is understandable that, the sub-magnets in the magnet module are mounted on the mounting rack 1113, facilitating the mounting of the magnets on the mover body 10, and the sub-magnets mounted on the mover body 10 are arranged more neat in the first preset direction AA, such that the magnet module has a more uniform and stable magnetic field. The sub-magnets may be fixed on the mounting rack 1113 to prevent the sub-magnets from falling off from the mounting rack 1113 during the moving of the mover 43. Definitely, the sub-magnets may also be detachable connected with the mounting rack 1113 according to actual requirements.

In some embodiments, the sub-magnets are strong magnets with strong magnetism. In order to avoid magnetic leakage or prevent the strong magnetism from causing negative effects on electronic elements, the mounting rack 1113 may be made of a material that is difficult to magnetize. For example, the mounting rack 1113 may be a material such as stainless steel, aluminum and copper, and may also isolate the strong magnetism on the basis of ensuring that the sub-magnets are stably mounted.

The arrangement mode of the sub-magnets arranged on the mounting rack 1113 is not limited in the embodiments of the disclosure. For example, the mounting rack 1113 is provided with mounting grooves 11131, which correspond to the sub-magnets on a one-to-one base. The two adjacent sub-magnets are spaced apart from each other and mounted in the corresponding mounting grooves 11131. The mounting grooves 11131 may prevent the sub-magnets from moving, and at the same time, may provide mounting positioning for the sub-magnets. Alternatively, the mounting rack 1113 is provided with one mounting groove 11131, and the two sub-magnets are adjacent to each other and arranged in the mounting groove 11131.

Figure 9:
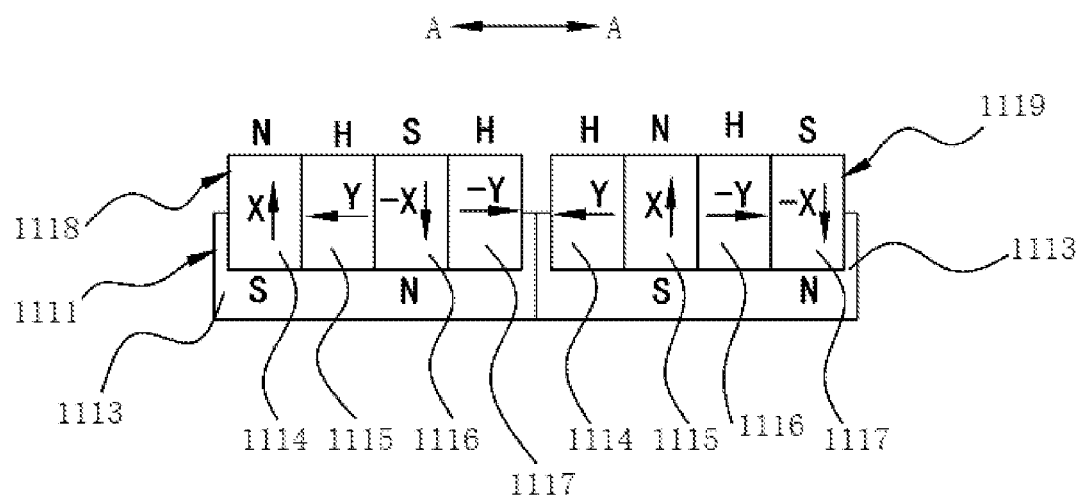
FIG. 9 is a schematic structural diagram of a first magnetic steel group of a mover according to another embodiment of the disclosure.

Referring to FIG. 9, in some embodiments of the disclosure, the magnet module includes a first sub-magnet 1114, a second sub-magnet 1115, a third sub-magnet 1116 and a fourth sub-magnet 1117, which are arranged in the first preset direction AA. It is understandable that, when the number of the sub-magnets in the magnet module is too small, the magnetic force of each magnet module is relatively small, and when the magnetic force of the mover 43 needs to be increased, more magnet modules need to be loaded, resulting in an increase in operation strength. In addition, when the number of the sub-magnets in the magnet module is too small, the sub-magnets in the magnet module are difficult to arrange to form the Halbach array.

In some embodiments, the first sub-magnet 1114, the second sub-magnet 1115, the third sub-magnet 1116 and the fourth sub-magnet 1117 are all common magnets/strong magnets; and an arrangement mode of the first sub-magnet 1114, the second sub-magnet 1115, the third sub-magnet 1116 and the fourth sub-magnet 1117 may be NSNS or SNSN.

Further, continuously referring to FIG. 9, a magnetization direction of the first sub-magnet 1114 is in a third preset direction X, and the third preset direction X is perpendicular to the first preset direction AA and the second preset direction BB.

A magnetization direction of the second sub-magnet 1115 is in a fourth preset direction Y, and the fourth preset direction Y is parallel to the first preset direction AA.

A magnetization direction of the third sub-magnet 1116 is in a fifth preset direction –X, and the fifth preset direction –X is opposite to the third preset direction X.

A magnetization direction of the fourth sub-magnet 1117 is in a sixth preset direction –Y, and the sixth preset direction –Y is opposite to the fourth preset direction Y.

It is understandable that, the first sub-magnet 1114, the second sub-magnet 1115, the third sub-magnet 1116 and the fourth sub-magnet 1117 are typically arranged by using the Halbach array. The first sub-magnet 1114 and the third sub-magnet 1116 are main magnets; and the second sub-magnet 1115 and the fourth sub-magnet 1117 are auxiliary magnets. Alternatively, the first sub-magnet 1114 and the third sub-magnet 1116 are both common magnets/strong magnets; the second sub-magnet 1115 and the fourth sub-magnet 1117 are both Halbach magnets; and the second sub-magnet 1115 and the fourth sub-magnet 1117 at least may affect the magnetic field arrangement of the first sub-magnet 1114 and the third sub-magnet 1116, such that the side of the magnet module that is close to the first armature winding 411 has denser magnetic lines of force. For example, when the first armature winding 411 is inserted into the accommodating groove 13, the third preset direction X is a direction pointing from the first sub-magnet 1114 to the first armature winding 411, the magnetic pole of the side of the first sub-magnet 1114 that is close to the first armature winding 411 is an N pole, and the magnetic pole of the side of the third sub-magnet 1116 that is close to the first armature winding 411 is an S pole.

Continuously referring to FIG. 9, in some embodiments of the disclosure, the first magnetic steel group 1111 includes a plurality of magnet modules; the plurality of magnet modules in the first magnetic steel group 1111 are arranged in the first preset direction AA; and the plurality of magnet modules are respectively detachable connected with the mover body 10. It is understandable that, the connection between each magnet module and the mover body 10 is independent, that is, each magnet module may be individually disassembled from the mover body 10.

In an embodiment of the disclosure, the plurality of magnet modules in the first magnetic steel group 1111 have at least one first magnet module 1118 or/and at least one second magnet module 1119.

The first sub-magnet 1114, the second sub-magnet 1115, the third sub-magnet 1116 and the fourth sub-magnet 1117 in the first magnet module 1118 are successively arranged in the first preset direction AA. The second sub-magnet 1115, the first sub-magnet 1114, the fourth sub-magnet 1117 and the third sub-magnet 1116 in the second magnet module 1119 are successively arranged in the first preset direction AA.

It is to be noted that, when the plurality of magnet modules in the first magnetic steel group 1111 have the first magnet module 1118, there may be 1, 2 or more first magnet modules 1118; and when the plurality of magnet modules in the first magnetic steel group 1111 have the second magnet module 1119, there may be 1, 2 or more second magnet modules 1119. For example, the magnetic pole of the side of the first sub-magnet 1114 that is close to the first armature winding 411 is the N pole, the magnetic pole of the side of the third sub-magnet 1116 that is close to the first armature winding 411 is the S pole, and H refers to the second sub-magnet 1115 and the fourth sub-magnet 1117, the arrangement mode of the sub-magnets in the first magnet module 1118 is NHSH, and the arrangement mode of the sub-magnets in the second magnet module 1119 is HNHS, such that the sub-magnets in the first magnet module 1118 and the second magnet module 1119 may all be arranged in the Halbach array. In addition, the first magnet module 1118 and the second magnet module 1119 may also be combined with each other, such that the structural diversity of the first magnetic steel groups 1111 in the mover 43 may be increased. A load-bearing range of the mover 43 is changed by changing the arrangement number of the first magnet module 1118 and/or the second magnet module 1119.

Further, when the plurality of magnet modules of the first magnetic steel group 1111 simultaneously have at least one first magnet module 1118 and at least one second magnet module 1119, the first magnet module 1118 and the second magnet module 1119 may either successively arranged tightly or mutually arranged at intervals.

Figure 10:
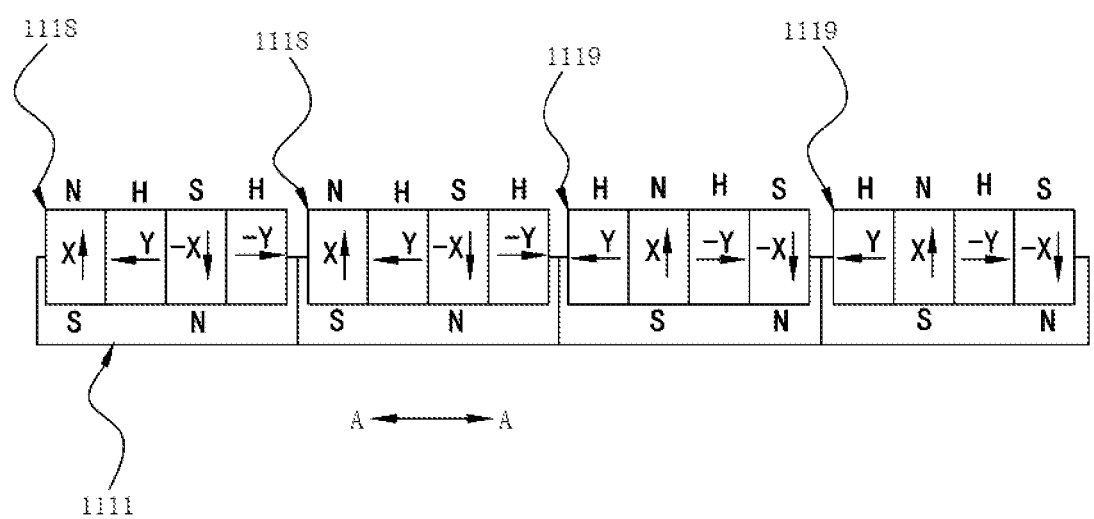
FIG. 10 is a schematic structural diagram of a first magnetic steel group of a mover according to another embodiment of the disclosure.

As shown in FIG. 10, when the plurality of magnet modules of the first magnetic steel group 1111 have a plurality of first magnet modules 1118 and a plurality of second magnet modules 1119, the plurality of first magnet modules 1118 or/and the plurality of second magnet modules 1119 may be continuously arranged. For example, the arrangement mode of the plurality of first magnet modules 1118 may be NHSH/NHSH, and the arrangement mode of the plurality of first magnet modules 1118 may be HNHS/HNHS.

Figure 11:
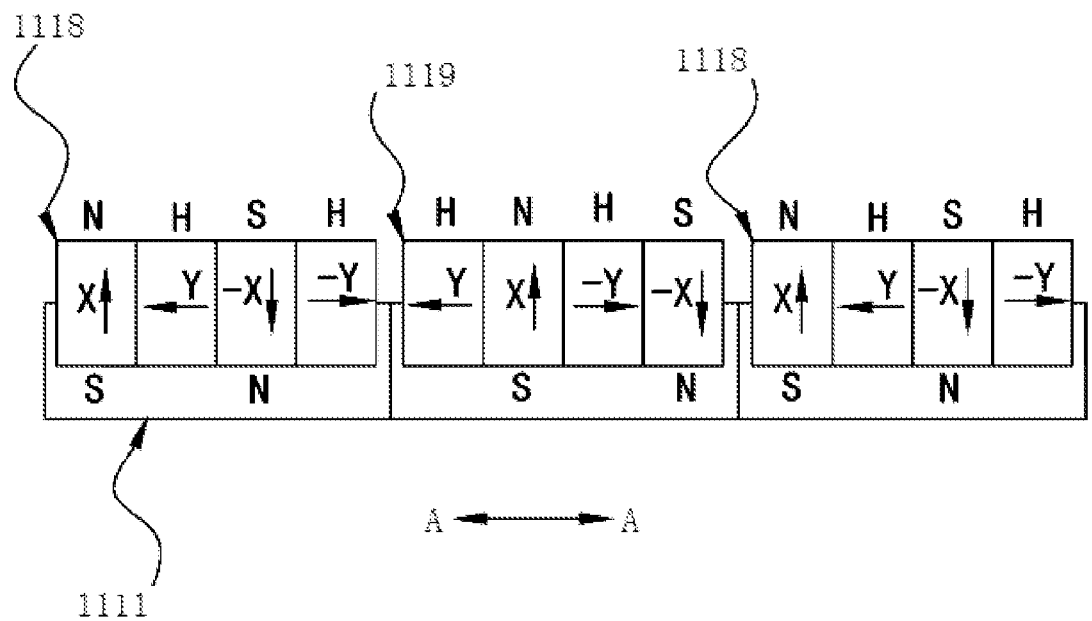
FIG. 11 is a schematic structural diagram of a first magnetic steel group of a mover according to another embodiment of the disclosure.

Definitely, as shown in FIG. 11, the first magnet modules 1118 and the second magnet modules 1119 may also be arranged alternately, for example, the arrangement mode may be NHSH/HNHS/NHSH.

Figure 12:
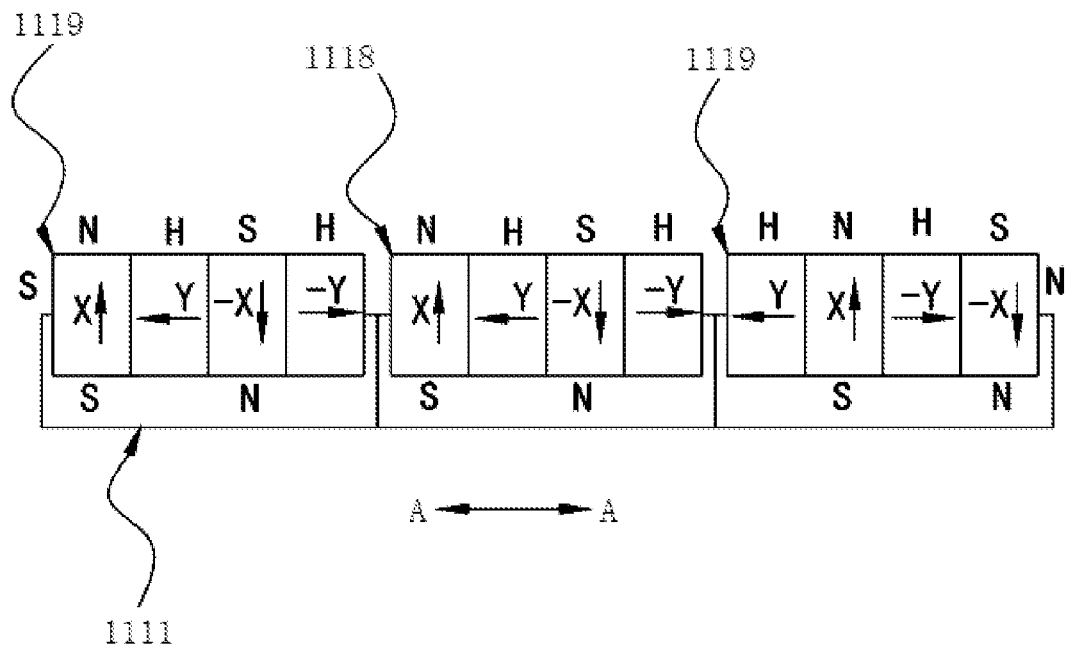
FIG. 12 is a schematic structural diagram of a first magnetic steel group of a mover according to another embodiment of the disclosure.

In an embodiment of the disclosure, as shown in FIG. 12, in the first magnetic steel group 1111, a magnetization direction of the sub-magnets located on a first end of the first magnetic steel group 1111 is in the third preset direction X, and a magnetization direction of the sub-magnets located on a second end of the first magnetic steel group 1111 is in the fifth preset direction –X, such that the magnetic poles of the sides, close to the first armature winding 411, of the two sub-magnets located on two ends of the first magnetic steel group 1111 are respectively an N pole and an S pole, so as to form a closed loop of magnetic induction lines.

In some embodiments of the disclosure, as shown in FIG. 12, in the first magnetic steel group 1111, in the first preset direction AA, the magnetization direction of the sub-magnets located on a first end of the first magnetic steel group 1111 is in the fourth preset direction Y, and a magnetization direction of the sub-magnets located on a second end of the first magnet modules 1118 is in the sixth preset direction −Y. That is to say, in the first preset direction AA, the magnetic poles of the two ends of the first magnetic steel group 1111 are respectively an N pole and an S pole, so as to form a closed loop of magnetic induction lines.

Figure 13:
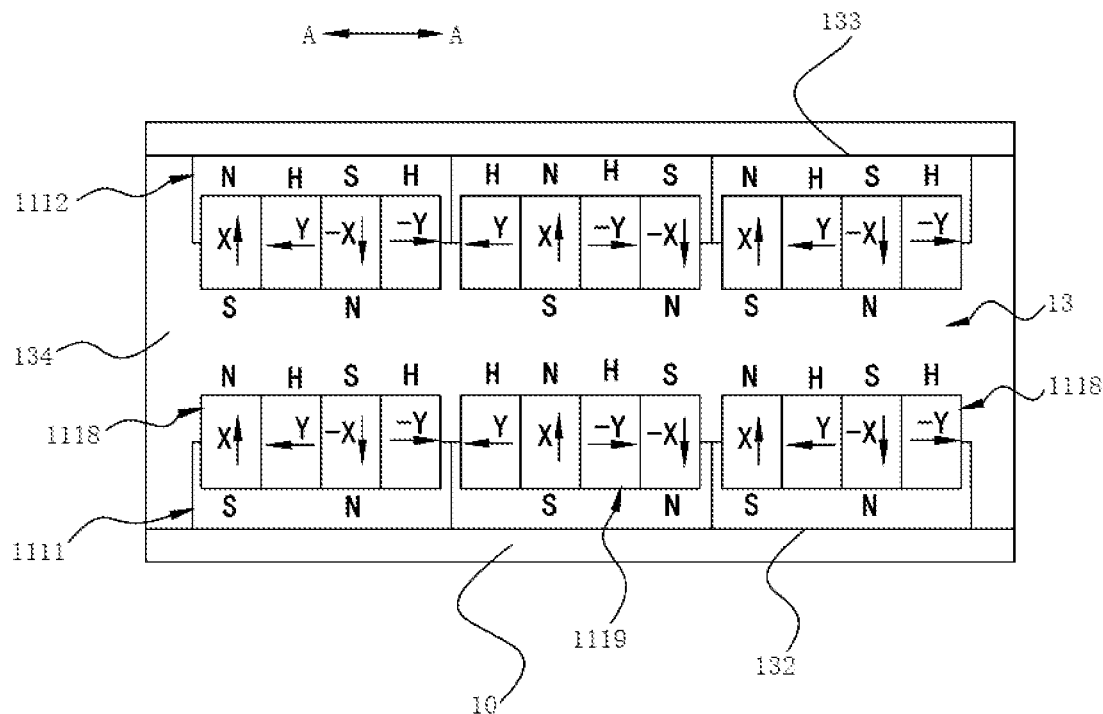
FIG. 13 shows respective schematic diagrams of a first magnetic steel group and a second magnetic steel group of a mover on a mover body according to another embodiment of the disclosure.

As shown in FIG. 13, in some embodiments of the disclosure, the mover 43 further includes a second magnetic steel group 1112. The second magnetic steel group 1112 is arranged on the second groove wall 133. The second magnetic steel group 1112 and the first magnetic steel group 1111 are arranged oppositely and spaced apart from each other. The second magnetic steel group 1112 includes at least one magnet module. The sub-magnets in the second magnetic steel group 1112 and the sub-magnets in the first magnetic steel group 1111 are arranged in a one-to-one correspondence; and the magnetization direction of the sub-magnets in the second magnetic steel group 1112 is the same as a magnetization direction of a corresponding sub-magnets in the first magnetic steel group 1111.

It is understandable that, when the first armature winding 411 is inserted into the accommodating groove 13, the first armature winding 411 is located between the first magnetic steel group 1111 and the second magnetic steel group 1112. By respectively arranging two rows of sub-magnet arrays in opposite arrangement on two sides of the first armature winding 411, on the basis of the constant volume of the mover 43, the magnetic force of the mover 43 may be further enhanced.

Further, a side of the first magnetic steel group 1111 that is close to the second magnetic steel group 1112 obtains magnetic field enhancement, and a side of the second magnetic steel group 1112 that is close to the first magnetic steel group 1111 obtains magnetic field enhancement. It is understandable that, when the first armature winding 411 is inserted into the accommodating groove 13, the side of the first magnetic steel group 1111 that is close to the second magnetic steel group 1112 is the side of the first magnetic steel group 1111 facing to the first armature winding 411; and the side of the second magnetic steel group 1112 that is close to the first magnetic steel group 1111 is the side of the second magnetic steel group 1112 facing to the first armature winding 411. The Halbach array has a single-sided magnetic density characteristic (that is, magnetic field enhancement). In the embodiments of the disclosure, the side of the first magnetic steel group 1111 that obtains magnetic field enhancement is designed as the side of the first magnetic steel group 1111 facing to the first armature winding 411, and the side of the second magnetic steel group 1112 that obtains magnetic field enhancement is designed as the side of the second magnetic steel group 1112 facing to the first armature winding 411. When the coil is energized, the mover 43 may obtain a larger driving force, such that the load capacity of mover 43 may further be improved.

In a second aspect, referring to FIGS. 14-30, the disclosure provides a mixed conveyor line 40. The mixed conveyor line includes a magnetic power conveyor line 41, an auxiliary conveyor line 42 and the mover 43 as described in any one of the above embodiments. The mover 43 is movable mounted on the magnetic power conveyor line 41 or the auxiliary conveyor line 42. The magnetic power conveyor line 41 includes a first armature winding 411 and a first guide rail 412. A first permanent magnet array 11 is mated with the first armature winding 411 to drive the mover 43 to move along the first guide rail 412. The auxiliary conveyor line 42 includes a first driving mechanism 421 and a second guide rail 422. A driven assembly 20 is cooperated with the first driving mechanism 421 to drive the mover 43 to move along the second guide rail 422.

It is to be noted that, in the embodiments of the disclosure, through the arrangement of the driven assembly 20 on the mover 43, the mover 43 may be applied to different types of transport lines. In particular, for some transport line sections with low conveying accuracy and no conveying speed requirements, the transport line sections may be replaced with the mixed conveyor line 40, so as to reduce the setting cost of the entire transport line.

Referring to FIG. 14, in some embodiments, an extending direction of the magnetic power conveyor line 41 may either be the same as an extending direction of the auxiliary conveyor line 42, or be different from the extending direction of the auxiliary conveyor line 42.

Figure 15:
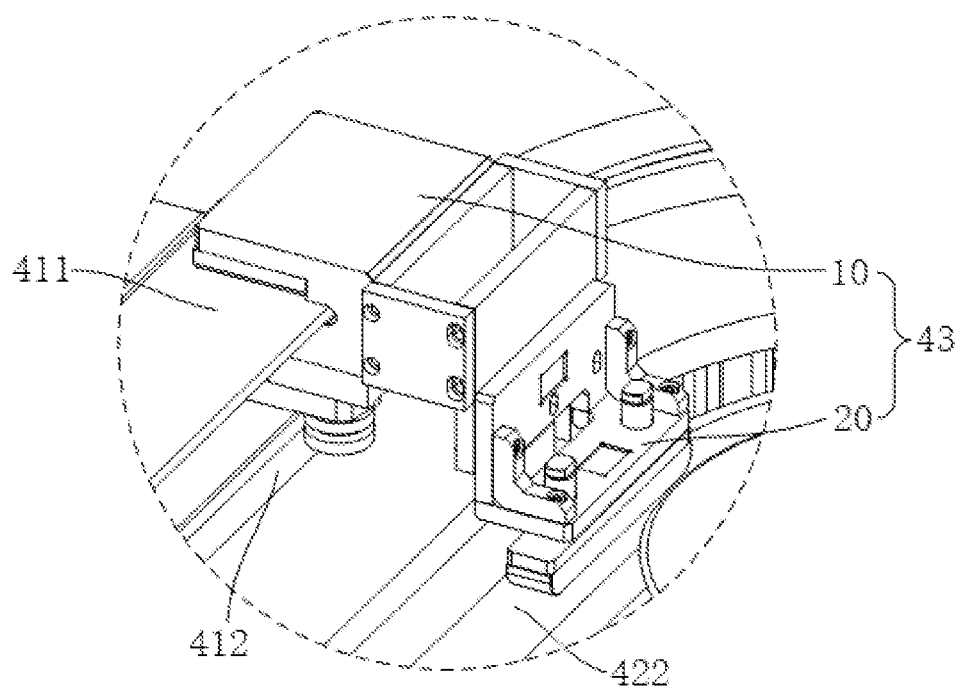
FIG. 15 is a schematic diagram of an enlarged structure of a part C in FIG. 14.
Figure 16:
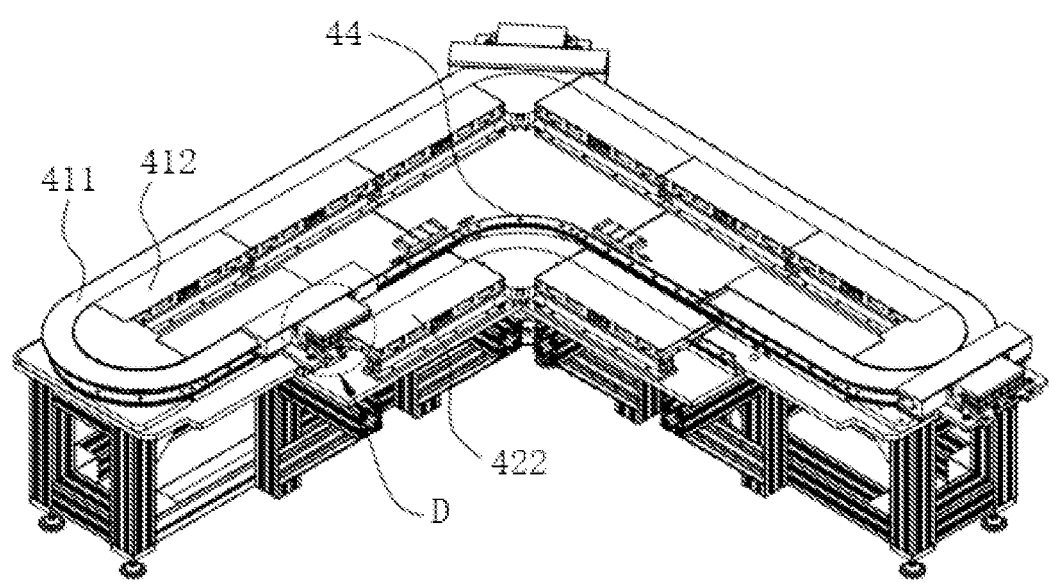
FIG. 16 is a schematic structural diagram of assembling of a plurality of movers and a mixed conveyor line according to another embodiment of the disclosure.

Specifically, as shown in FIG. 15, the mover 43 may include a slidable assembly, which is cooperated with the first guide rail 412 or the second guide rail 422. The slidable assembly is configured to move along the first guide rail 412 or the second guide rail 422. The first guide rail 412 or the second guide rail 422 may be configured to guide and limit a moving path of the mover 43, such that the mover 43 may move in an extending direction of the first guide rail 412 or the second guide rail 422, thereby avoiding negative situations such as derailment during the running of mover 43.

Further, referring to FIG. 14, in some embodiments of the disclosure, there are a plurality of movers 43 arranged. Each of the movers 43 includes a buffer member 33 (as shown in FIG. 5). When the plurality of movers 43 are all mounted on the magnetic power conveyor line 41 or the auxiliary conveyor line 42, in a moving direction of the movers 43, buffer members 33 are correspondingly arranged on two opposite sides of mover bodies 10.

It is to be noted that, on the magnetic power conveyor line 41 or the auxiliary conveyor line 42, each mover 43 moves independently of each other with respect to all other movers 43. In order to reduce the negative effects of accidental collisions when the plurality of movers 43 are running on the same transport line 2, in this embodiment, the arranged buffer members 33 of the two adjacent movers 43 are first in contact with each other. The buffer members 33 may first deform to absorb the generated energy to reduce an impact force, so as to protect the safety of the movers 43 and materials to be transported on the movers 43. A preparation material of the buffer members 33 may use materials with elasticity and toughness, such as rubber, resin or plastic.

Further, referring to FIGS. 14-17, in some embodiments of the disclosure, the mixed conveyor line 40 is provided with at least one arc section 44. At the arc section 44, the first guide rail 412 and the second guide rail 422 are arranged in a non-collinear manner.

It is to be noted that, when the mover 43 moves on the mixed conveyor line 40 and the mixed conveyor line 40 is provided with the arc section 44, the mover 43 needs to turn at the arc section 44 of the transport line. Since the first guide rail 412 and the second guide rail 422 are arranged in a non-collinear manner, the first guide rail 412 and the second guide rail 422 have different turning angles/turning radii during turning, such that the moving form of the mover 43 at the arc section 44 may be selected according to actual working condition requirements, that is, whether the mover 43 is guided by using the first guide rail 412 or guided by using the second guide rail 422 during turning may be selected according to the working condition requirements. It is understandable that, in some embodiments, if the driven assembly 20 and the first driving mechanism 421 (that is, the mover 43 moving on the second guide rail 422) have a more stable mating structure compared with the first permanent magnet array 11 and the first armature winding 411 (that is, the mover 43 moving on the first guide rail 412), at the arc section 44, the second guide rail 422 may have a longer moving journey, or the second guide rail 422 may have a larger turning angle, so as to guarantee the moving stability of the mover 43 at the arc section 44. In some embodiments, the second guide rail 422 may have a shorter moving journey, or the second guide rail 422 may have a smaller turning angle, so as to make the mover 43 have a higher moving speed at the arc section 44. In some embodiments, the mover 43 is only mated with one of the first armature winding 411 and the first driving mechanism 421 at the arc section 44, that is, the mover 43 only moves on one of the first guide rail 412 and the second guide rail 422, such that the setting cost of a transport line body may be reduced. It is understandable that, in some embodiments, if the driven assembly 20 and the first driving mechanism 421 have a lower setting cost compared with the first permanent magnet array 11 and the first armature winding 411, at a linear section or the arc section 44, the driven assembly 20 may only be arranged to be in transport connection with the first driving mechanism 421, so as to reduce the setting cost of the entire transport line.

With the development of manufacturing automation, magnetic power conveyor lines are increasingly used in the conveying process of product processing and manufacturing, so as to achieve the transfer of semi-finished products between different processing stations.

The fast conveying speed, high positioning accuracy and flexible takt time (the moving speed of the movers on the magnetic power conveyor line for transporting semi-finished products may be set according to time cycle requirements of the takt time) are features of the magnetic power conveyor line that are recognized in the process of conveying products. However, the magnetic power conveyor line is expensive and the use of magnetic power conveyor line for the whole production line leads to high deployment cost of the production line.

Figure 19:
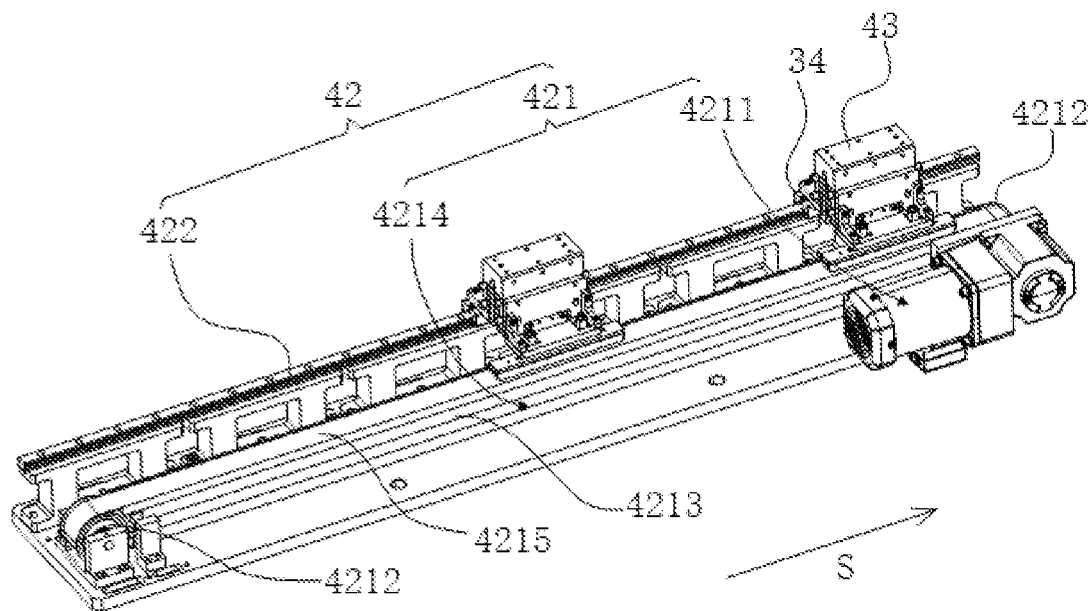
FIG. 19 is a schematic diagram of an entire structure of an auxiliary conveyor line of a mixed conveyor line according to an embodiment of the disclosure.
Figure 20:
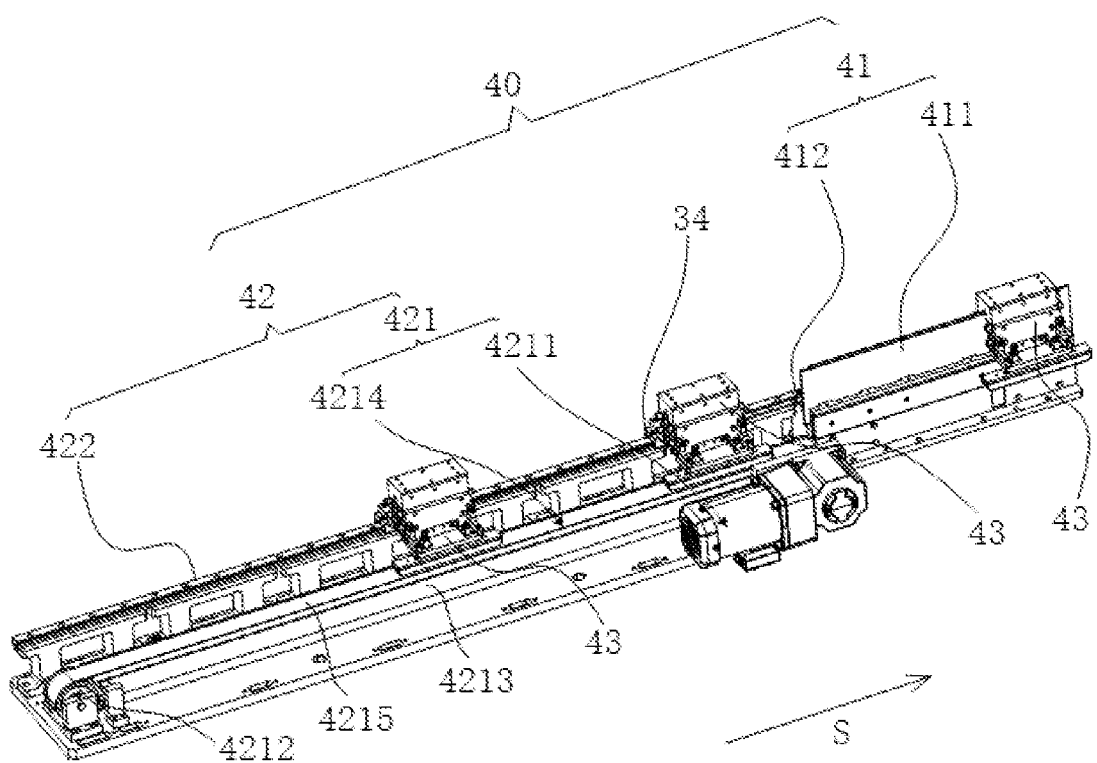
FIG. 20 is a schematic structural diagram of an auxiliary conveyor line of a mixed conveyor line that is mated with a magnetic power conveyor line according to an embodiment of the disclosure.

In order to solve the above problem, referring to FIG. 19 to FIG. 20, an embodiment of the disclosure provides an auxiliary conveyor line 42 and a mixed conveyor line 40. The mixed conveyor line 40 includes a magnetic power conveyor line 41, the auxiliary conveyor line 42 and a mover 43.

The auxiliary conveyor line 42 is configured to be mated with the magnetic power conveyor line 41, and both the auxiliary conveyor line and the magnetic power conveyor line may drive the mover 43 to move. The deployment cost of the auxiliary conveyor line 42 is relatively low, and the deployment cost of the magnetic power conveyor line 41 is relatively high. When an actual production line is deployed, the auxiliary conveyor line 42 may be used in a reflux process and processes with low positioning accuracy and transport speed requirements; and the magnetic power conveyor line 41 may be used in processes with high positioning accuracy and transport speed requirements. In addition, the auxiliary conveyor line 42 and the magnetic power conveyor line 41 may be combined to form the mixed conveyor line 40, so as to ensure that the deployment cost of the production line is reduced on the basis of the production line having flexibility and efficiency.

Figure 21:
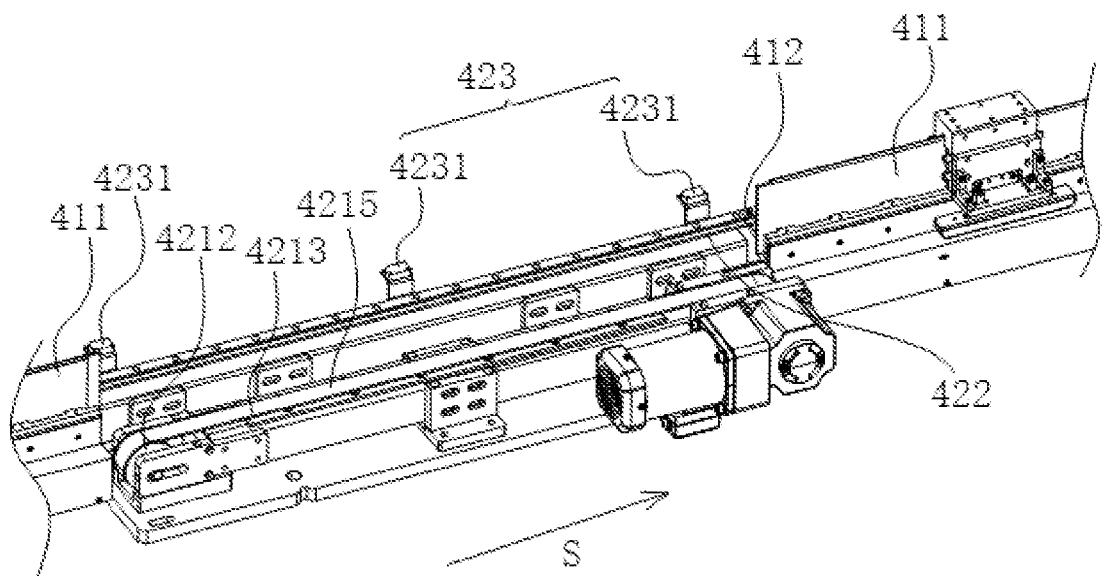
FIG. 21 is a schematic structural diagram of another form of an auxiliary conveyor line of a mixed conveyor line that is mated with a magnetic power conveyor line according to an embodiment of the disclosure.

Further, in combination with FIG. 19 to FIG. 21, the auxiliary conveyor line 42 may include a second guide rail 422, a first driving mechanism 421 and a position sensing assembly 423. The mover 43 may include a sliding block 34. The second guide rail 422 usually extends linearly. The sliding block 34 and the second guide rail 422 form a linear guide rail. The sliding block 34 may move in an extending direction of the second guide rail 422; and the second guide rail 422 guides and limits a moving path of the mover 43. In this embodiment, the design form of the auxiliary conveyor line 42 is not limited. The auxiliary conveyor line 42 may be designed as a linear conveyor line, or a curved conveyor line, for example, an arc conveyor line.

In the embodiments of the disclosure, a specific arrangement structure of the sliding block 34 is not limited. The sliding block 34 may be cooperated with the second guide rail 422 in various types of structures, so as to move on the second guide rail 422. For example, the sliding block 34 may include a sliding block with a sliding groove. The sliding groove is configured to accommodate the second guide rail 422. When the mover 43 moves, the sliding block may be driven to move along the second guide rail 422. For another example, the sliding block 34 may include a slidable roller. The slidable roller is configured to roll along the second guide rail 422. When the mover 43 moves, the slidable roller may be driven to roll along the second guide rail 422. Definitely, the sliding block 34 may also simultaneously include the sliding block with the sliding groove, and the slidable roller. When the mover 43 moves, the sliding block moves along the second guide rail 422, and the slidable roller rolls along the second guide rail 422 at the same time. For another example, the sliding block 34 may include a sliding block with a ball (that is, a ball sliding block). When the mover 43 moves, a ball in the ball sliding block may be driven to roll on the second guide rail 422, so as to drive the ball sliding block to move along the second guide rail 422.

The sliding block 34 is usually made of 45 steel which is subjected to quenching and tempering. Because the 45 steel subjected to quenching and tempering may increase the abrasive resistance of the sliding block 34, the sliding block 34 may be made to withstand the sliding friction arising from the sliding connection with the second guide rail 422, such that the service life of the sliding block 34 may be prolonged. The second guide rail 422 is usually made of materials such as bearing steel, carbon steel, and stainless steel. The application of such materials may improve the strength, hardness, and abrasive resistance of the second guide rail 422, so as to prolong the service life of the second guide rail 422. Further, the second guide rail 422 is usually manufactured by mechanical processing and cold-drawing processing, such that the tensile strength of the second guide rail 422 may be improved, thereby guaranteeing the smoothness and stability of the sliding connection between the sliding block 34 and the second guide rail 422.

Further, the first driving mechanism 421 is used to drive the sliding block 34 to move along the second guide rail 422 (for example, the second guide rail 422 in FIG. 20 linearly extending). The first driving mechanism 421 may include a transport member 4211 and an docking structure 4214. The transport member 4211 may include a synchronous pulley 4212, a linear motor, a rotary motor, lead screws, racks, and the like. The docking structure 4214 may include at least one of a friction transport structure, a fixed transport structure or a magnetic transport structure, and this embodiment is not limited thereto.

The transport member 4211 being the synchronous pulley 4212 and the friction transport structure being a synchronous belt 4215 are used as examples for description. In combination with FIG. 19 to FIG. 22, the synchronous pulley 4212 and the synchronous belt 4215 are in transport connection, so as to drive at least partial synchronous belt 4215 to move in a guide direction S. The synchronous belt 4215 is configured to connect the mover 43, so as to make the mover 43 to move along the second guide rail 422.

Figure 22:
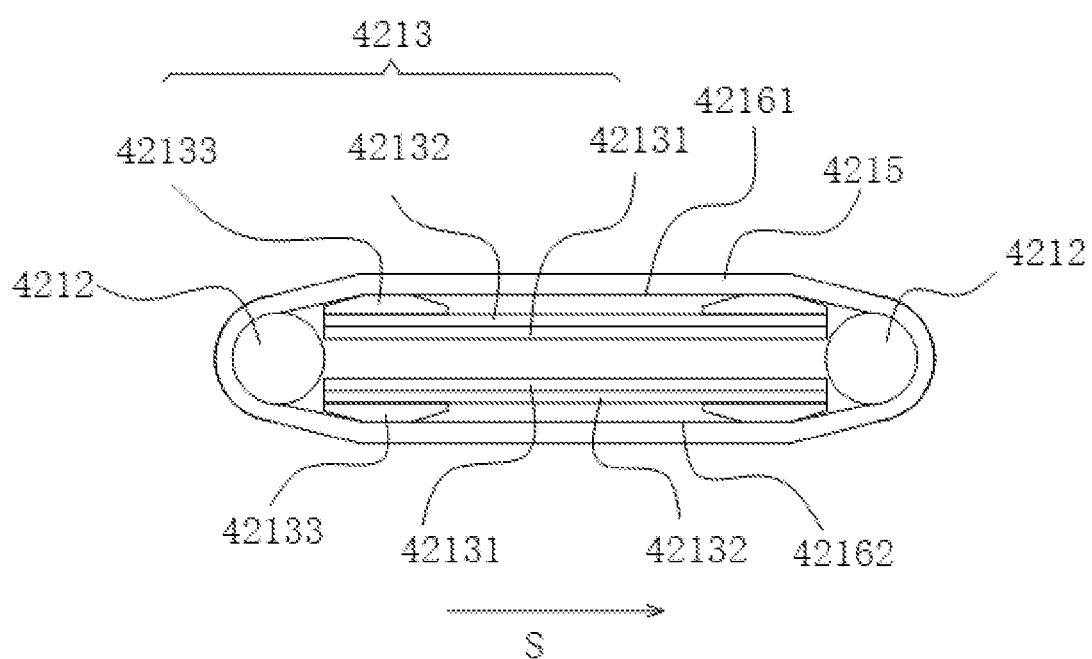
FIG. 22 is a schematic structural diagram of a friction transport structure (including two synchronous pulleys) of a mixed conveyor line according to an embodiment of the disclosure.

Referring to FIG. 22, in combination with FIG. 19, the first driving mechanism 421 may include the docking structure 4214 that implements abutment by the friction transport structure. Specifically, the docking structure 4214 may include the synchronous belt 4215. The transport member 4211 includes the synchronous pulley 4212, and a support structure 4213 for supporting the synchronous belt 4215. Two synchronous pulleys 4212 may be arranged. The two synchronous pulleys 4212 are spaced apart from each other, and the synchronous belt 4215 is sleeved on the peripheral sides of the two synchronous pulleys 4212. A conveying direction of the synchronous belt 4215 is parallel to the guide direction S of the second guide rail 422. The synchronous pulleys 4212 drive the synchronous belt 4215 to rotate. In some embodiments, the peripheral sides of the synchronous pulleys 4212 may be provided with connection teeth. The sides of the synchronous belt 4215 that are close to the synchronous pulleys 4212 are provided with tooth slots. With the rotation of the synchronous pulleys 4212, the connection teeth are in clamping connection with and separated from the tooth slots, so as to cause the synchronous pulleys 4212 to drive the synchronous belt 4215 to rotate. In addition, through the clamping connection and separation between the connection teeth and the tooth slots, the synchronous pulleys 4212 may be stably connected with the synchronous belt 4215, so as to improve the operation stability of the synchronous belt 4215.

Transport connection parts between the synchronous pulleys 4212 and the synchronous belt 4215 may also be provided with transport teeth meshing with each other. With the rotation of the synchronous pulleys 4212, the synchronous belt 4215 is driven to rotate. It is to be noted that, the transport connection between the synchronous belt 4215 and the synchronous pulleys 4212 is not limited in the disclosure, which may be designed according to actual requirements.

Further, the first driving mechanism 421 may be located in the same mounting plane with the second guide rail 422 (referring to FIG. 19, the synchronous belt 4215 and the second guide rail 422 being mounted in the same horizontal table top). The synchronous belt 4215 may be located on a left side or a right side (according to different checking angles, it may also be considered as a front side or a rear side) of the second guide rail 422. In some embodiments, the synchronous belt 4215 may also be mounted in the same vertical plane with the second guide rail 422 (for example, the synchronous belt 4215 and the second guide rail 422 being mounted in the same vertical table top). The synchronous belt 4215 is located on an upper side or a lower side of the second guide rail 422. It is to be noted that, the position of the synchronous belt 4215 relative to the second guide rail 422 depends on the structure of the mover 43, such that, with an allowed spatial position, a position relationship between the synchronous belt 4215 and the second guide rail 422 may be determined by adjusting the structure of the mover 43. In the disclosure, the position relationship between the synchronous belt 4215 and the second guide rail 422 is not limited, and may be designed according to actual requirements.

Figure 23:
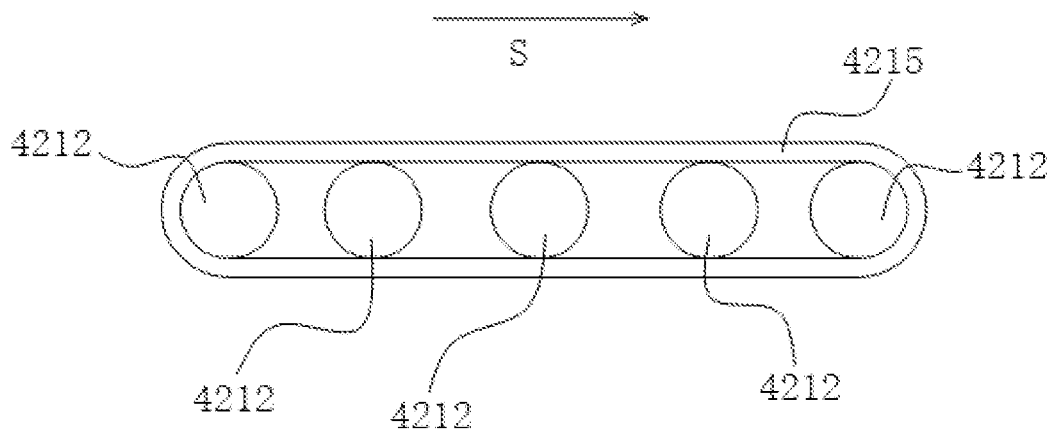
FIG. 23 is a schematic structural diagram of a friction transport structure (including a plurality of synchronous pulleys) of a mixed conveyor line according to an embodiment of the disclosure.

In some embodiments, referring to FIG. 23, a plurality of synchronous pulleys 4212 may be arranged. The plurality of synchronous pulleys 4212 are arranged at intervals, and the synchronous belt 4215 is sleeved on the peripheral sides of the plurality of synchronous pulleys 4212. The synchronous pulleys 4212 at two end portions of the plurality of synchronous pulleys 4212 are used as driving pulleys, which may provide power for the transport of the synchronous belt 4215. The synchronous pulleys 4212 in the middle position are used as driven pulleys, which may provide support for the synchronous belt 4215, so as to prevent the synchronous belt 4215 from deforming due to excessive load bearing and affecting the rotation of the synchronous belt 4215. In some embodiments, the synchronous pulleys 4212 in the middle are also used as driving pulleys (the synchronous pulleys 4212 in the middle being driven by a driving force), such that power may be provided for the transport of the synchronous belt 4215 on the basis of supporting the synchronous belt 4215. It is to be noted that, the spacing between the two adjacent synchronous pulleys in the plurality of synchronous pulleys 4212 may be set according to the length of the synchronous belt 4215.

In some embodiments, the first driving mechanism 421 may further include the docking structure 4214 that implements abutment by the fixed transport structure. For example, one of the docking structure 4214 and the mover 43 is provided with a gear, and the other one is provided with a rack. Through the meshing of the gear and the rack, the mover 43 is driven to do rectilinear motion, such that the mover 43 may be transmitted in the guide direction S of the second guide rail 422. Alternatively, in some embodiments, the first driving mechanism 421 may further include the docking structure 4214 that implements abutment by a belt conveyor system, and a belt. Specifically, the docking structure 4214 may be a plate chain. The plate chain is provided on the belt and may be fixedly connected with the mover 43. The belt moves to drive the plate chain to move, so as to drive the mover 43 to move, such that the mover 43 may be transmitted in the guide direction S of the second guide rail 422. For another example, in some embodiments, the first driving mechanism 421 includes the synchronous belt 4215 and the synchronous pulleys 4212. The synchronous belt 4215 is provided with a shifting rod that is fixedly connected with a shifting fork. The mover 43 is provided with the shifting fork. The shifting rod is fixedly connected with the shifting fork with the moving of the synchronous pulleys 4212, so as to drive the mover 43 to transmit in the guide direction S of the second guide rail 422.

Figure 24:
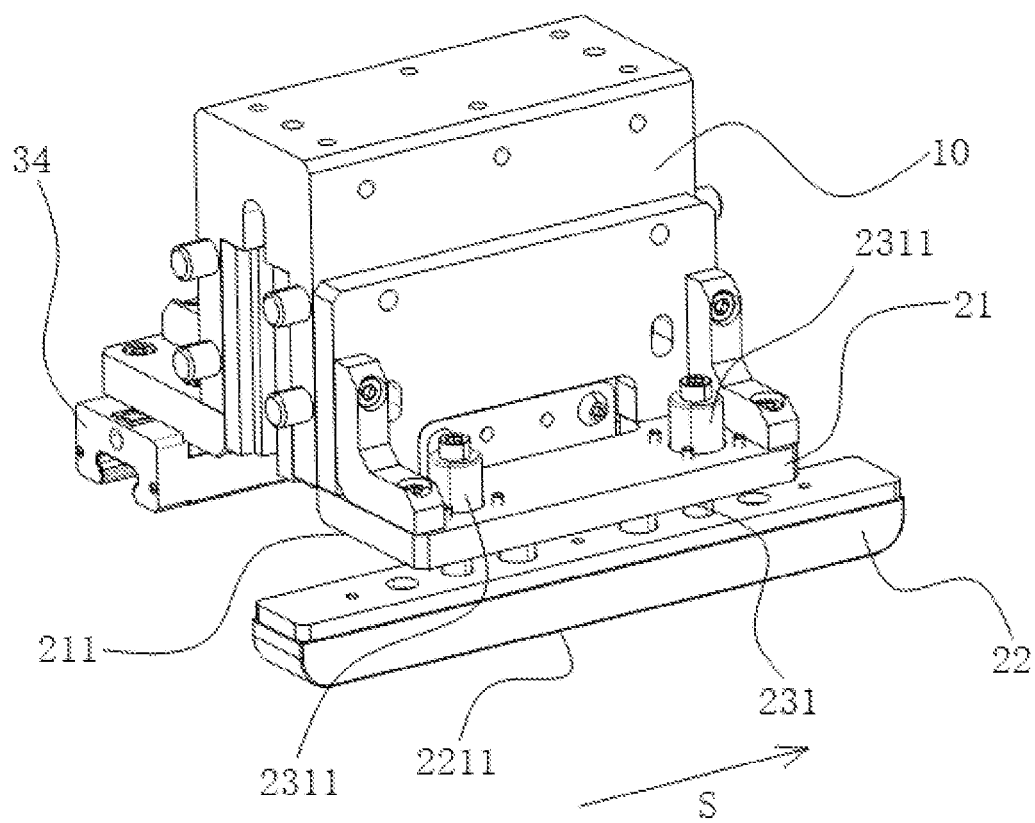
FIG. 24 is a schematic structural diagram of a mover of a mixed conveyor line according to an embodiment of the disclosure.

Further, the synchronous belt 4215 is configured to connect the mover 43, so as to cause the mover 43 to move in the guide direction S of the second guide rail 422. The synchronous belt 4215 may abut against the mover 43 by friction transport. Specifically, the mover 43 is configured to carry semi-finished products; and by the moving of the position of the mover 43, the semi-finished products are transported to corresponding processing stations. Referring to FIG. 24, in combination with FIG. 19, the mover 43 includes a mover body 10, a fixed structure 21 and a driven assembly 20. The fixed structure 21 is mounted and fixed on the mover body 10 by bolts, so as to ensure the firmness of the connection between the fixed structure 21 and the mover body 10. The sliding block 34 is slidably mated with the second guide rail 422 and moves in the guide direction S of the second guide rail 422. The sliding block 34 is fixedly connected with the mover body 10, such that the sliding block 34 may move in the guide direction S of the second guide rail 422.

In some embodiments, the fixed structure 21 and the sliding block 34 may be mounted on the mover body 10 by welding or clamping connection. The fixed structure 21 and the sliding block 34 may also be integrated formed with the mover body 10, so as to improve the rigidity of the fixed structure 21 and the mover body 10. A casting material may be casting alloy (including cast iron, cast steel, and cast non-ferrous alloy) or casting plastic (including polystyrene, polyester resin, and epoxy resin).

Further, referring to FIG. 24, in combination with FIG. 19, the fixed structure 21 may be designed in a plate shape, and the plane where the plate-shaped fixed structure 21 is located is parallel to a belt surface of the synchronous belt 4215. The fixed structure 21 is provided with a through hole (not shown in the figure), and the central axis of the through hole is perpendicular to the belt surface of the synchronous belt 4215.

The driven assembly 20 may include a friction structure 22, a guide rod 231 and an elastic member (not shown in the figure). One end of the guide rod 231 movable penetrates in the through hole, and another end is fixedly connected with the friction structure 22 by bolts, such that the friction structure 22 may do reciprocating motion in the direction (which is perpendicular to the belt surface of the synchronous belt 4215) of the central axis of the through hole with the limitation of the position of the through hole. In order to ensure the firmness of the connection between the friction structure 22 and the guide rod 231, the guide rod 231 and the friction structure 22 may be fixed by welding or integral molding, and may be arranged according to actual requirements, and the disclosure is not limited thereto.

In order to make the friction structure 22 do reciprocating motion in the direction of the central axis of the through hole within a length range of the guide rod 231, the end of the guide rod 231 that is away from the friction structure 22 is provided with a gear portion 2311. The gear portion 2311 may be a gear ring or a gear head, so as to prevent the guide rod 231 from separating a moving section which is defined by the through hole of the fixed structure 21.

Further, the friction structure 22 and the synchronous belt 4215 are in friction transport. The position of the friction structure 22 may be moved under the driving of the synchronous belt 4215, such that the synchronous belt 4215 may drive the mover 43 to move in the guide direction S of the second guide rail 422. The transport mode of the friction transport is simple, such that the cost of the transport connection between the friction structure 22 and the synchronous belt 4215 may be saved.

In order to ensure the frictional force generated between the friction structure 22 and the synchronous belt 4215, the synchronous belt 4215 may drive the friction structure 22 for position movement. The elastic member may be sleeved on a peripheral side of the guide rod 231, and is located between the fixed structure 21 and the friction structure 22. By the elastic force of the elastic member, the pressure transmitted by the friction structure 22 to the synchronous belt 4215 is ensured. According to an equation of the frictional force: $f=\mu*FN$, when a coefficient $\mu$ of friction is constant, the pressure FN transmitted by the friction structure 22 to the synchronous belt 4215 is greater, such that the frictional force f between the friction structure 22 and the synchronous belt 4215 is greater.

In some embodiments, the docking structure 4214 of the mover 43 and the synchronous belt 4215 may also include the docking structure 4214 that implements abutment by fixed transport, and the docking structure 4214 that implements abutment by magnetic adsorption transport. The process of action and the principle of action of both are relatively conventional and are not described in detail.

Figure 25:
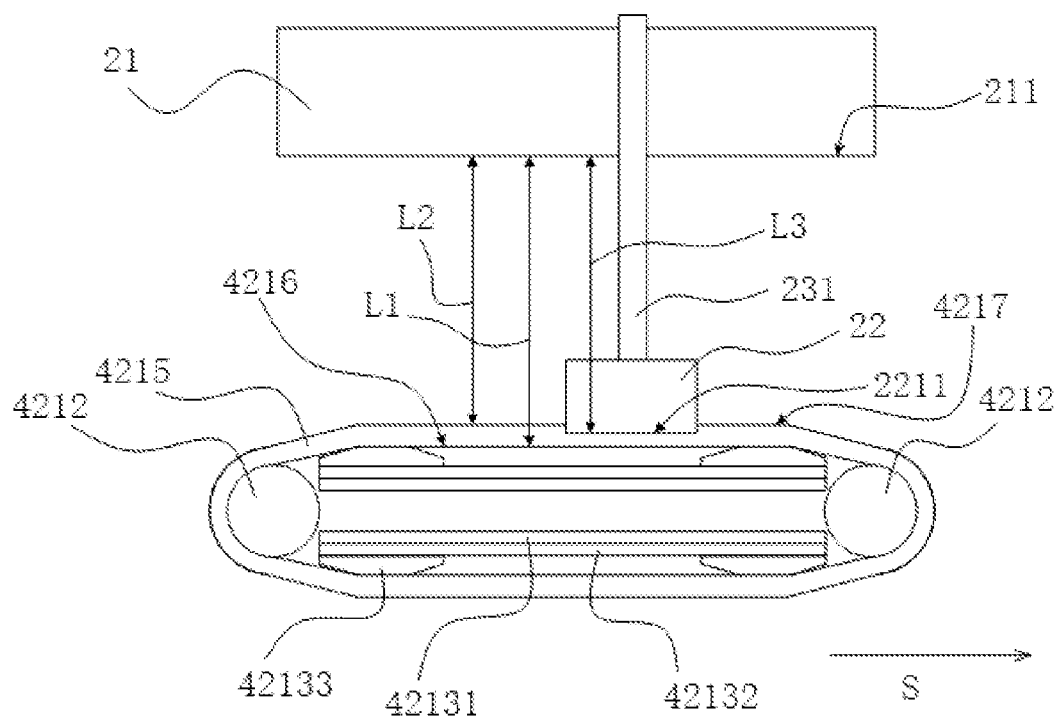
FIG. 25 is a simplified schematic diagram of a structure of a mover of a mixed conveyor line that is mated with a friction transport structure according to an embodiment of the disclosure.

In order to further increase the pressure that is applied, by the friction structure 22, to the belt surface of the synchronous belt 4215, referring to FIG. 25, the fixed structure 21 is provided with a mounting surface 211 close to the belt surface of the synchronous belt 4215. The friction structure 22 is provided with a friction surface 2211 close to the synchronous belt 4215. The synchronous belt 4215 is provided with an internal contact surface 4216 and an external contact surface 4217 (the internal contact surface 4216 and the external contact surface 4217 of the synchronous belt 4215 being two opposite surfaces of the belt surface of the synchronous belt 4215, the internal contact surface 4216 being located inside a ring structure enclosed by the synchronous belt 4215, and the external contact surface 4217 be located outside the ring structure enclosed by the synchronous belt 4215). Conveying portions of the internal contact surface 4216 and the external contact surface 4217 of the synchronous belt 4215 may both be parallel to a horizontal plane. The synchronous pulleys 4212 are in contact with the internal contact surface 4216 of the synchronous belt 4215, such that the synchronous pulleys 4212 are driven to rotate the synchronous belt 4215 by friction transport. The friction structure 22 is in contact with the external contact surface 4217 of the synchronous belt 4215, such that the friction structure 22 and the external contact surface 4217 of the synchronous belt 4215 are in friction transport to drive the friction structure 22 for position movement, so as to realize the position movement of the mover 43.

The external contact surface 4217 of the synchronous belt 4215 is arranged corresponding to the mounting surface 211 of the fixed structure 21. In an extending direction of the central axis of the through hole, a distance between the mounting surface 211 of the fixed structure 21 and the internal contact surface 4216 of the synchronous belt 4215 is L1*mm*; a distance between the mounting surface 211 of the fixed structure 21 and the external contact surface 4217 of the synchronous belt 4215 is L2*mm*; a distance between the mounting surface 211 of the fixed structure 21 and the friction surface 2211 of the friction structure 22 is L3*mm*; and a conditional expression: L1*mm*>L3*mm*>L2*mm* is met.

By meeting the above conditional expression, the friction structure 22 and the external contact surface 4217 of the synchronous belt 4215 may be in interference fit, such that the pressure between the friction structure 22 and the external contact surface 4217 of the synchronous belt 4215 is increased, and the frictional force between the friction structure 22 and the synchronous belt 4215 is increased, thereby improving the reliability of friction transport between the friction structure 22 and the synchronous belt 4215, so as to cause the synchronous belt 4215 to drive to the friction structure 22 to move.

In some embodiments, the internal contact surface 4216 and the external contact surface 4217 of the synchronous belt 4215 may both be perpendicular to the horizontal plane, and the distance between the external contact surface 4217 and the mounting surface 211 is less than the distance between the friction surface 2211 and the mounting surface 211, such that the friction structure 22 and the belt surface of the synchronous belt 4215 are in interference fit to increase the frictional force between the friction structure and the belt surface.

Further, referring to FIG. 22, in combination with FIG. 19 and FIG. 25, the transport member 4211 further includes a support structure 4213 for supporting the synchronous belt 4215, and the support structure 4213 extends in a conveying direction of the synchronous belt 4215. In this case, the internal contact surfaces 4216 of the synchronous belt 4215 that are located between the two synchronous pulleys 4212 and arranged opposite to each other are respectively recorded as a first internal connecting portion 42161 and a second internal connecting portion 42162. The support structure 4213 is located between the two synchronous pulleys 4212, and is within a range that is enclosed by the two synchronous pulleys 4212 and the synchronous belt 4215. There may be two groups of support structures 4213; one group bears against the first internal connecting portion 42161, and another group bears against the second internal connecting portion 42162, such that the support structures 4213 may support the synchronous belt 4215 corresponding to the first internal connecting portion 42161 and the second internal connecting portion 42162. Therefore, the synchronous belt 4215 is prevented from deforming under the action of gravity, so as to guarantee the rotation smoothness of the synchronous belt 4215.

In some embodiments, according to different positions where the mover 43 docking against the synchronous belt 4215, the mover 43 may respectively be friction transport with the external contact surfaces 4217 of the synchronous belt 4215 corresponding to the first internal connecting portion 42161 and the second internal connecting portion 42162, so as to improve the diversity and flexibility of the conveying mode of the auxiliary conveyor line 42.

In some embodiments, there may also be one group of support structures 4213, and the one group of support structures docking against the first internal connecting portion 42161 (or the second internal connecting portion 42162), so as to support the synchronous belt 4215. In addition, the mover 43 may be in friction transport with the external contact surfaces 4217 of the synchronous belt 4215 corresponding to the first internal connecting portion 42161 (or the mover 43 may be in friction transport with the external contact surfaces 4217 of the synchronous belt 4215 corresponding to the second internal connecting portion 42162). The position of the support structures 4213 may be set according to actual requirements, and is not limited in the disclosure.

Further, referring to FIG. 22, the support structure 4213 may include a hard support plate 42131 and a soft support plate 42132. The hard support plate 42131 and the soft support plate 42132 are stacked in a direction perpendicular to a surface of the synchronous belt 4215. The soft support plate 42132 is located between the hard support plate 42131 and the synchronous belt 4215, and is configured to support a position of the synchronous belt 4215 that drives the mover 43 to move.

The soft support plate 42132 may be make of plastics, and is in contact with the synchronous belt 4215, so as to buffer the load of the mover 43. The hard support plate 42131 may be a section bar, which is configured to support the synchronous belt 4215, so as to guarantee the operation smoothness of the synchronous belt 4215. In addition, the soft support plate 42132 is provided with a smooth surface that is in contact with the synchronous belt 4215. When a stator has a heavy load, the hard support plate 42131 is configured to support the synchronous belt 4215, so as to ensure the rotation of the synchronous belt 4215. Meanwhile, the smooth surface of the soft support plate 42132 may reduce the friction between the synchronous belt 4215 and the soft support plate 42132, so as to accelerate the conveying speed of the synchronous belt 4215; and when the stator has the heavy load, the soft support plate 42132 may also play a role of buffering the arrangement of the hard support plate 42131.

Further, the support structure 4213 further includes at least two transition members 42133. The two transition members 42133 are arranged between the soft support plate 42132 and the synchronous belt 4215, so as to achieve the effect of tensioning the synchronous belt 4215. In addition, the two transition members 42133 are located on two ends of the soft support plate 42132 that are close to the synchronous pulleys 4212, such that the height of an end face of the synchronous belt 4215 may be raised, so as to cause the raised belt surface of the synchronous belt 4215 to be parallel to the horizontal plane. By raising the height of the end face of the synchronous belt 4215, the friction block better docking against the synchronous belt 4215, so as to enhance the frictional force between the friction structure 22 and the synchronous belt 4215.

Further, through the arrangement of the transition members 42133, the friction structure 22 may stably be in friction transport connection with the synchronous belt 4215, and when the mover 43 transitions from the auxiliary conveyor line 42 to the magnetic power conveyor line 41, through the arrangement of the transition members 42133, the mover 43 may move more stably to the magnetic power conveyor line 41.

In order to adjust the moving speed of the mover 43 according to requirements, referring to FIG. 21 and in combination with FIG. 19, the position sensing assembly 423 includes a plurality of position sensors 4231, and a controller (not shown in the figure) electrically connected with the plurality of position sensors 4231. The plurality of position sensors 4231 are successively arranged in the guide direction S of the second guide rail 422, and are in screwing connection with the second guide rail 422 by a connecting plate, such that the position sensors 4231 are firmly connected with an auxiliary sensor. In some embodiments, the connection mode between the position sensors 4231 and the second guide rail 422 may also be bonding connection or clamping connection, or may be designed according to actual requirements, and is not limited in the disclosure.

When the mover 43 passes through the position sensors 4231, the position sensors 4231 may detect position information (the position information including the position of the mover 43 and the speed of the mover 43) of the mover 43, and output the position information of the mover 43 to the controller. The controller adjusts the transport speed of the synchronous belt 4215 according to the received position information of the mover 43. In addition, the mover 43 and the synchronous belt 4215 are in friction transport, such that the moving speed of the mover 43 varies with the speed of the synchronous belt 4215, and therefore, according to the actual requirements for the moving of the mover 43, the rotary speed of the synchronous pulleys 4212 is adjusted by the controller.

Further, each of the plurality of the position sensors 4231 may include a signal transmitter (not shown in the figure) and a signal receiver (not shown in the figure). The signal receiver may be mounted on one side of the second guide rail 422, and is fixedly connected with the second guide rail 422 by bolts. The signal transmitter may be mounted on the mover 43. The mover 43 moves along the second guide rail 422, to trigger the signal transmitter to send a signal. When the signal sent by the signal transmitter and received by the signal receiver is changed, the signal receiver outputs the position information of the mover 43 to the controller.

By controlling the rotary speed of the synchronous belt 4215 to adjust the moving speed of the mover 43, when the mover 43 moves from the magnetic power conveyor line 41 to the auxiliary conveyor line 42, the moving speed of the mover 43 may be accelerated, so as to cause the mover 43 to rapidly move on the auxiliary conveyor line 42. When the mover 43 moves from the auxiliary conveyor line 42 to the magnetic power conveyor line 41, the moving speed of the mover 43 may be decreased, such that the mover 43 may stably move from the auxiliary conveyor line 42 to the magnetic power conveyor line 41.

In some embodiments, the signal transmitter may also be mounted on one side of the second guide rail 422; and the signal receiver may be mounted on the mover 43. When the signal sent by the signal transmitter and received by the signal receiver is changed, the signal receiver outputs the position information of the mover 43 to the controller.

In some embodiments, the signal transmitter and the signal receiver may both be mounted on the second guide rail 422. When the mover 43 moves in the guide direction S of the second guide rail 422, and when the signal sent by the signal transmitter and received by the signal receiver is changed, the signal receiver outputs the position information of the mover 43 to the controller.

Further, the position sensor 4231 may include a magnetic grating sensor. The magnetic grating sensor may include a magnetic grid, a magnetic head and a detection circuit. The magnetic grid is configured to record a sinusoidal signal or a rectangular signal with a certain power; and the magnetic head is configured to read the sinusoidal signal or the rectangular signal on the magnetic grid, and convert the read signal into an electrical signal and transmit the same to the controller.

The magnetic head may include a dynamic magnetic head and a static magnetic head; and the difference between the dynamic magnetic head and the static magnetic head is determined by the way that the dynamic magnetic head and the static magnetic head read the signal. The dynamic magnetic head includes a group of output windings. Only when the dynamic magnetic head moves relative to the magnetic grid, the dynamic magnetic head can read and write the signal on the magnetic grid, and may convert the read and written signal into the electrical signal and transmit the same to the controller. In this way, the dynamic magnetic head may be mounted on the mover 43, and with the moving of the mover 43 along the second guide rail 422 under the driving of the synchronous belt 4215, the dynamic magnetic head outputs the sinusoidal signal or the rectangular signal with a certain frequency to the controller.

The static magnetic head is wound with two coils on an iron core. The two coils include exciting windings and output windings. There is no relative movement between the static magnetic head and the magnetic grid. Generally, several magnetic heads are connected in series to form a static magnetic head body; and the static magnetic head body is arranged on one side of the magnetic grid.

When an alternating excitation signal is applied to the exciting windings, two excitation signals generate a magnetic flux within each alternating signal period, so as to make the iron core saturated. Since the magnetic resistance of the iron core is great, the magnetic flux of the signal on the magnetic grid cannot pass through the magnetic head, such that the output windings cannot output induced electromotive force. When the excitation signal crosses zero twice in each alternating signal period, the iron core is not saturated, such that the magnetic flux of the signal on the magnetic grid can pass through the iron core of the output windings, and the output windings output the induced electromotive force.

In this case, the static magnetic head may serve as the signal transmitter and the magnetic grid may serve as the signal receiver, and the signal transmitter and the signal receiver may both be mounted on the second guide rail 422. The mover 43 moves in the guide direction S of the second guide rail 422, such that the static magnetic head may read and write the signal on the magnetic grid, and convey the read and written signal to the controller.

In some embodiments, the position sensor 4231 may also be one or more Hall sensors; and the Hall sensors are arranged on at least one side of the second guide rail 422. When the mover 43 runs at the Hall sensors, magnetic fields generated by the permanent magnets in the mover 43 distort magnetic fields of charge carriers in the Hall sensors. That is to say, when the mover 43 moves to the Hall sensors, the magnetic flux density of the permanent magnets in the mover 43 exceeds a preset threshold of the Hall sensors. The sensor detects the magnetic flux density and generates a Hall voltage, that is, the distance between the mover 43 and the Hall sensor is detected by the Hall effect. Then a signal with distance data is transmitted to the controller, such that the controller controls the conveying speed of the synchronous belt 4215, thereby controlling the moving speed of the mover 43.

In some embodiments, the position sensor 4231 may further include at least one of an optical grating sensor, an infrared sensor, a color sensor, or a Hall sensor. The specific principle of action and the process of action are relatively conventional and are not described here.

Further, a second aspect of the disclosure provides a mixed conveyor line 40. Referring to FIG. 21, the mixed conveyor line 40 includes a plurality of groups of magnetic power conveyor lines 41 and a plurality of groups of auxiliary conveyor lines 42. The plurality of groups of magnetic power conveyor lines 41 and the plurality of groups of auxiliary conveyor lines 42 are successively arranged alternately in the guide direction S of the second guide rail 422, so as to form a conveying structure of magnetic power conveyor line 41-auxiliary conveyor line 42-magnetic power conveyor line 41, or a conveying structure of auxiliary conveyor line 42-magnetic power conveyor line 41-auxiliary conveyor line 42. Therefore, the magnetic power conveyor line may be used in processes with high positioning accuracy and high conveying speed requirements, and the auxiliary conveyor line 42 is used in processes with high positioning accuracy and low transport speed requirements, such that requirements of the movers 43 for the speed and accuracy of the semi-finished products may be met, and the deployment cost of the production line may be reduced.

Further, in order to facilitate the abutment of the magnetic power conveyor line and the auxiliary conveyor line 42, referring to FIG. 21 and in combination with FIG. 1, the magnetic power conveyor line 41 further includes a first guide rail 412. When the magnetic power conveyor line 41 docking against the auxiliary conveyor line 42, the second guide rail 422 docking against the first guide rail 412. It is to be noted that, the second guide rail 422 and the first guide rail 412 have the same cross section, such that a sliding block may slide on the second guide rail 422 and the first guide rail 412. In this way, when the magnetic power conveyor line 41 and the auxiliary conveyor line 42 are arranged alternately, the sliding block 34 may move from the magnetic power conveyor line 41 to the auxiliary conveyor line 42, and then move from the auxiliary conveyor line 42 to the magnetic power conveyor line 41, such that it may be ensured that the sliding block 34 smoothly moves on the production line that is formed by alternately arranging the magnetic power conveyor line 41 and the auxiliary conveyor line 42.

Referring to FIG. 1 to FIG. 21, the magnetic power conveyor line 41 further includes a first armature winding 411. The mover body 10 is connected with the first armature winding 411. A coil in the first armature winding 411 is energized with an alternating current, so as to change the moving speed of the mover 43 at the corresponding position of the first armature winding 411. Further, a plurality of movers 43 may be arranged on the same first armature winding 411. The moving of the movers 43 at different position is respectively controlled by controlling the alternating currents in the coils of the corresponding positions of different movers 43. Then, in order to cooperate with the moving of the plurality of different movers 43 on the first armature winding 411, the auxiliary conveyor line 42 may also be provided with the plurality of different movers 43, so as to convey semi-finished products at the same time, thereby improving the processing efficiency of the semi-finished products.

Figure 26:
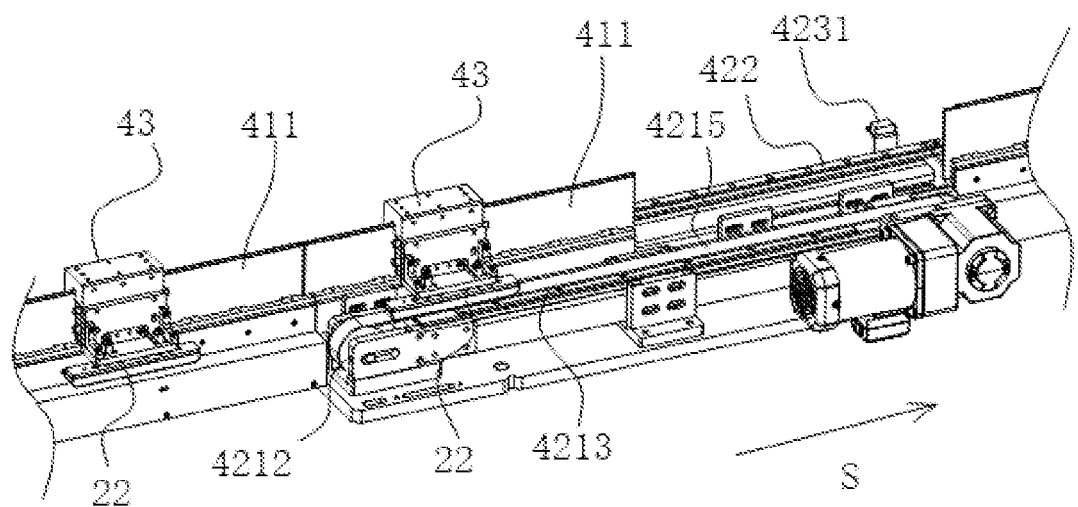
FIG. 26 is a schematic structural diagram of still another form of an auxiliary conveyor line of a mixed conveyor line that is mated with a magnetic power conveyor line according to an embodiment of the disclosure.

Further, referring to FIG. 26, when a processing station corresponding to the magnetic power conveyor line 41 is changed, requirements of the corresponding position of the magnetic power conveyor line 41 for the positioning accuracy and the transport speed of the semi-finished products are relatively low, the synchronous belt 4215 may extend to the position corresponding to the magnetic power conveyor line 41. In this case, the coil in the first armature winding 411 is not energized with the alternating current, such that the synchronous belt 4215 may drive the mover on the first guide rail 412 of the magnetic power conveyor line 41.

Figure 27:
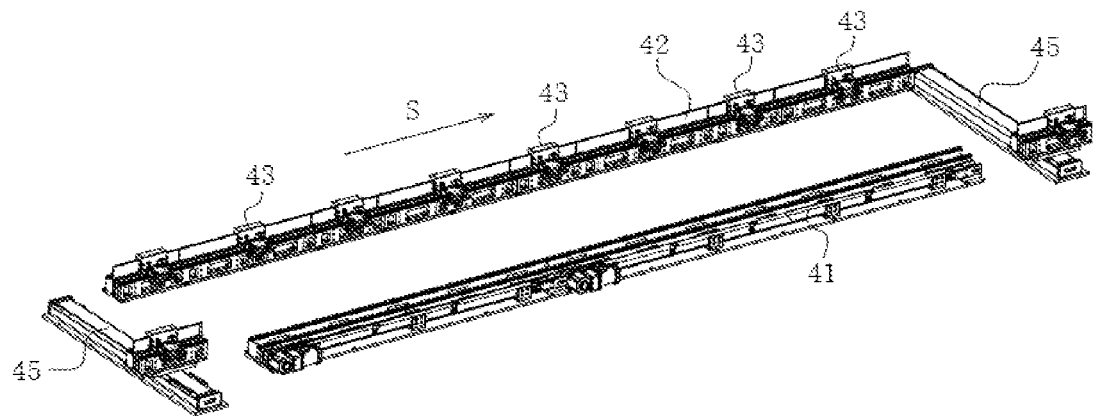
FIG. 27 is a schematic structural diagram of an auxiliary conveyor line and a magnetic power conveyor line of a mixed conveyor line that are located on a same horizontal mounting table top according to an embodiment of the disclosure.

In some embodiments, referring to FIG. 27, the mixed conveyor line 40 may further include a docking assembly 45, and the docking assembly 45 is configured to connect the magnetic power conveyor line 41 and the auxiliary conveyor line 42.

Further, the auxiliary conveyor line 42 is located on one side of the magnetic power conveyor line 41 and is parallel to the magnetic power conveyor line 41. It is understandable that, the auxiliary conveyor line 42 and the magnetic power conveyor line 41 are both parallel to the guide direction S of the second guide rail 422. In addition, in order to facilitate the connection between the docking assembly 45 and the auxiliary conveyor line 42 and the magnetic power conveyor line 41, an extending length of the auxiliary conveyor line 42 along the second guide rail 422 needs to be the same as an extending length of the magnetic power conveyor line 41 along the second guide rail 422.

There are two groups of docking assemblies 45. One group of docking assemblies 45 is configured to connect a head of the auxiliary conveyor line 42 and a tail of the magnetic power conveyor line 41, and another group of docking assemblies 45 is configured to connect a tail of the auxiliary conveyor line 42 and a head of the magnetic power conveyor line 41, such that the magnetic power conveyor line 41 may be deployed in an conveying process of the semi-finished products with high positioning accuracy and requirements for conveying speed; and the auxiliary conveyor line 42 may serve as a reflux conveyor line to transmit the mover 43 from the tail of the magnetic power conveyor line 41 to the head of the magnetic power conveyor line 41, so as to cause the mover 43 to transport the semi-finished products to the corresponding working stations. In addition, the recycling of the mover 43 may be realized. While the magnetic power conveyor line 41 is used to improve production efficiency, the auxiliary conveyor line 42 returns the mover 43 back to the magnetic power conveyor line, such that the number of the movers 43 may be reduced, thereby further reducing the deployment cost of the production line.

Through the arrangement of the docking assemblies 45, the mixed conveyor line 40 obtained by combining the auxiliary conveyor line 42 and the magnetic power conveyor line 41 may be conveniently mounted and connected, such that mounting difficulty is greatly reduced, and the applicability of the mixed conveyor line 40 may be greatly improved.

Figure 28:
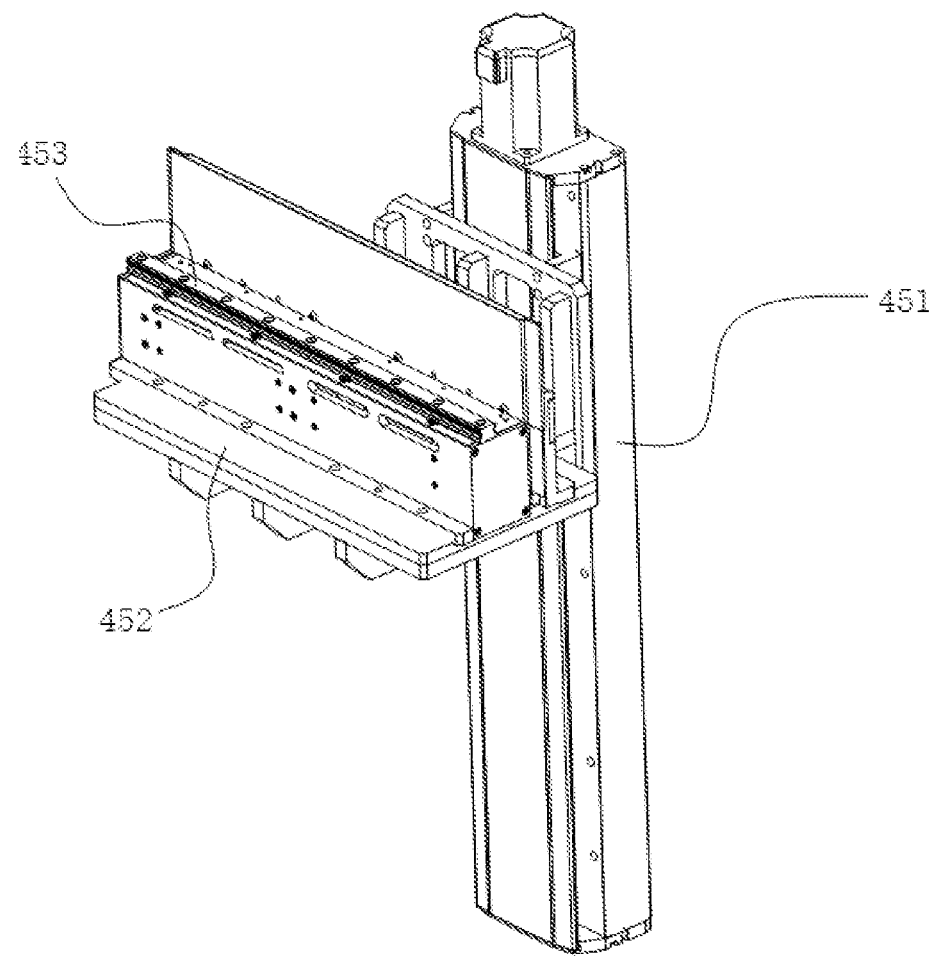
FIG. 28 is a schematic structural diagram of a docking assembly of a mixed conveyor line according to an embodiment of the disclosure.

Referring to FIG. 28, each of the docking assemblies 45 may include a docking sliding rail 451, a docking sliding block 452 and a docking guide rail 453. The docking sliding rail 451 is perpendicular to the second guide rail 422. The docking sliding block 452 may be slidably arranged on the docking sliding rail 451, and may do reciprocating motion in a guide direction S of the docking sliding rail 451.

The docking guide rail 453 is fixedly connected with the docking sliding block 452 by bolts, and a guide direction S of the docking guide rail 453 is perpendicular to the guide direction S of the docking sliding rail 451, that is, the docking guide rail 453 is parallel to both the auxiliary conveyor line 42 and the magnetic power conveyor line, such that when the docking assembly 45 is connected with the magnetic power conveyor line, the docking guide rail 453 of the docking assembly 45 docking against the first guide rail 412, and the docking guide rail 453 is collinear with the magnetic power conveyor line, so as to cause the mover 43 to convey from the first guide rail 412 to the docking guide rail 453 and convey from the docking guide rail 453 to the first guide rail 412. When the docking assembly 45 docking against the auxiliary conveyor line 42, the docking guide rail 453 of the docking assembly 45 docking against the second guide rail 422, and the docking guide rail 453 is collinear with the second guide rail 422, so as to cause the mover 43 to convey from the second guide rail 422 to the docking guide rail 453 and convey from the docking guide rail 453 to the second guide rail 422. By using the docking assembly 45, the switching of the conveyor line is easy to realize, such that the mixed conveyor line formed by the magnetic power conveyor line and the auxiliary conveyor line 42 is applied to more transport scenarios.

Figure 29:
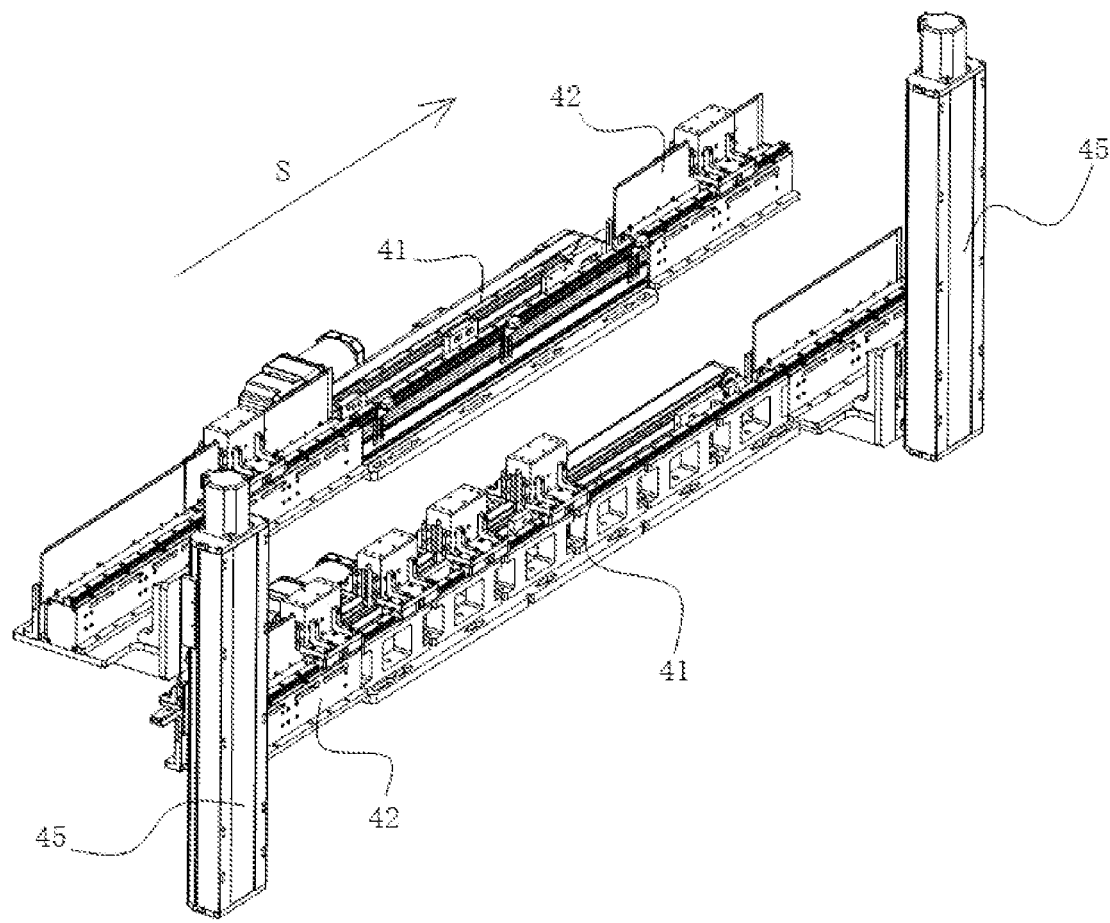
FIG. 29 is a schematic structural diagram of an auxiliary conveyor line and a magnetic power conveyor line of a mixed conveyor line that are located on a same vertical mounting table top according to an embodiment of the disclosure.

Further, referring to FIG. 27, the auxiliary conveyor line 42 may be arranged in the same horizontal mounting table top with the magnetic power conveyor line 41; the auxiliary conveyor line 42 and the magnetic power conveyor line 41 are arranged parallel in a horizontal direction; and the docking assembly 45 is configured to connect the auxiliary conveyor line 42 and the magnetic power conveyor line 41. Referring to FIG. 29, the auxiliary conveyor line 42 may also be arranged in the same vertical mounting table top with the magnetic power conveyor line 41; the auxiliary conveyor line 42 and the magnetic power conveyor line are arranged parallel in a vertical direction; and the docking assembly 45 is configured to connect the auxiliary conveyor line 42 and the magnetic power conveyor line 41. Therefore, the mixed conveyor line 40 formed by the auxiliary conveyor line 42 and the magnetic power conveyor line 41 may be arranged in different conveying surroundings, so as to improve the applicability of the mixed conveyor line 40.

In some embodiments, the second guide rail 422 may also be designed in a curve shape. When a curve-shaped contour is in a standard arc shape, the transport member 4211 may be a friction disk body rotating around the central axis of the standard arc shape. The friction disk body is provided with a contact surface that is in contact with the friction surface 2211 of the friction structure 22. The distance between the external contact surface 4217 and the mounting surface 211 is less than the distance between the friction surface 2211 and the mounting surface 211, such that the friction structure 22 and the belt surface of the synchronous belt 4215 are in interference fit to increase the frictional force between the friction structure and the belt surface. Alternatively, the conveying of the mover 43 in a non-standard arc curved shape is realized by arranging a conveyor belt matching the curve-shaped contour of the standard arc shape. When the curve-shaped contour is in a non-standard arc shape, the friction disk bodies with different diameters may be arranged according to curves at different positions of the curve-shaped contour. Alternatively, the conveying of the mover 43 in the non-standard arc curved shape may be realized by arranging the conveyor belt matching a non-standard arc shape.

Figure 30:
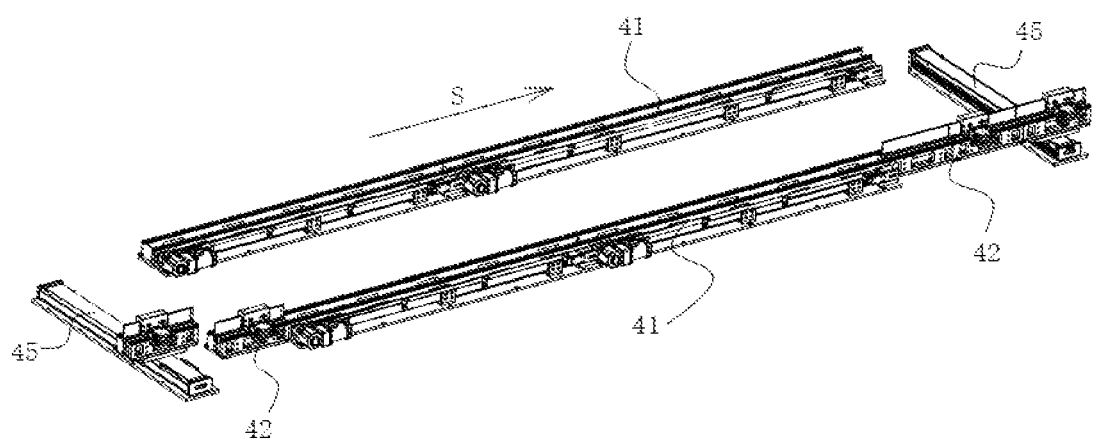
FIG. 30 is a schematic structural diagram of a mixed conveyor line (a conveying section including an auxiliary conveyor line and a magnetic power conveyor line) according to an embodiment of the disclosure.

Further, referring to FIG. 30, there may be a plurality of groups of magnetic power conveyor lines 41. There are a plurality of groups of auxiliary conveyor lines 42, and one of the auxiliary conveyor lines 42 is used as a reflux section. The plurality of groups of magnetic power conveyor lines 41 and the plurality of groups of auxiliary conveyor lines 42 are successively alternately arranged along the second guide rail 422, so as to form a conveying section. One group of docking assemblies 45 connects a tail of the conveying section with a head of the reflux section, and another group of docking assemblies 45 connects a head of the reflux section with a tail of the conveying section.

The conveying section may be used for a product conveying line, such that the magnetic power conveyor lines 41 are arranged at positions of the product conveying line with high positioning accuracy and high-speed requirements, and the auxiliary conveyor lines 42 are arranged at positions of the product conveying line with low positioning accuracy and low speed requirements. Therefore, the magnetic power conveyor lines and the auxiliary conveyor lines 42 may be rationally deployed on the product conveying line, so as to reduce the deployment cost of the production line. The reflux section of the production line has low requirements for the positioning accuracy and speed of the mover 43, such that the auxiliary conveyor lines 42 may be arranged. Therefore, the deployment cost of the production line may be reduced while conveying accuracy and conveying speed of the semi-finished products is further guaranteed.

In this way, the magnetic power conveyor lines 41 and the auxiliary conveyor lines 42 may be flexibly arranged in the conveying processes of processing and manufacturing products according to different takt times of the semi-finished products conveyed in different processes, such that the entire transport line can more flexibly meet different demands of users. In addition, through the modular arrangement of the auxiliary conveyor lines 42, the magnetic power conveyor lines 41 and the docking assemblies 45, a mounting space may be saved while the assembling convenience of the transport line is improved.

The above are only the preferred embodiments of the disclosure and are not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

What is claimed is:

1. A mover, wherein at least being able to be applied to a magnetic power conveyor line and a mixed conveyor line, and movable mounted on the magnetic power conveyor line or the mixed conveyor line, the magnetic power conveyor line comprises a first armature winding, and the mixed conveyor line comprises a first driving mechanism; and the mover comprises:
    a mover body, comprising a first permanent magnet array, wherein the first permanent magnet array comprises two first permanent magnets which are oppositely spaced apart from each other, and the two first permanent magnets and the first armature winding drive, by current excitation, the mover body to move along the magnetic power conveyor line; the mover body is provided with an accommodating groove, and the accommodating groove extends in a first preset direction to penetrate two ends of the mover body; the accommodating groove extends in a second preset direction, so as to form, on one side of the mover body, a notch that allows the armature winding to enter and exit the accommodating groove; the second preset direction is perpendicular to the first preset direction; the accommodating groove comprises a first groove wall, a second groove wall and a third groove wall; the third groove wall is arranged opposite to the notch; the first groove wall and the second groove wall are arranged opposite to each other, and are respectively located on two sides of the third groove wall; the first permanent magnet comprises a first magnetic steel group which is arranged on the first groove wall and a second magnetic steel group which is arranged on the second groove wall; the second magnetic steel group and the first magnetic steel group are arranged opposite to each other and spaced apart from each other; the first magnetic steel group and the second magnetic steel group both comprise at least one magnet module, which is arranged in the first preset direction; the magnet module is detachable connected with the mover body; and the magnet module comprises a plurality of sub-magnets, which are arranged in the first preset direction; and
    a driven assembly, connected with the mover body, and configured to be in transport connection with the first driving mechanism and drive the mover body to move along the magnetic power conveyor line or the mixed conveyor line.

2. The mover according to claim 1, wherein
    the mover body comprises a connecting portion, which is connected with the first permanent magnet array and the driven assembly, wherein the driven assembly and the first permanent magnet array are located on two opposite sides of the connecting portion; and
    a transport mode between the driven assembly and the first driving mechanism is at least one of a friction transport, a magnetic adsorption transport, or a fixed contact transport.

3. The mover according to claim 1, wherein the transport mode between the driven assembly and the first driving mechanism is the friction transport, and the driven assembly comprises:
    a fixed structure, connected with the mover body;
    a friction structure, configured to abut against the first driving mechanism and generate frictional resistance; and a tensioning structure, located between the fixed structure and the friction structure, connected with the fixed structure and the friction structure, and configured to tightly bear the friction structure against the first driving mechanism.

4. The mover according to claim 3, wherein the friction structure comprises:
a friction block, configured to abut against the first driving mechanism and generate frictional resistance; and
a fixed block, fixedly connected with the friction block, wherein an orthographic projection of the fixed block on the friction block covers the friction block, and the friction block is arranged on a surface of the fixed structure that is away from the tensioning structure; and
the tensioning structure comprises:
a guide rod, wherein one end of the guide rod is movable connected with the fixed structure, and the other end of the guide rod is fixedly connected with the fixed block; and
an elastic member, sleeved on the guide rod, wherein one end of the elastic member docking against the fixed block, and the other end of the elastic member docking against the fixed structure.

5. The mover according to claim 4, wherein a preparation material of the friction block is at least one of rubber or resin.

6. The mover according to claim 1, wherein
there are two groups of the driven assemblies, and two groups of the driven assemblies are located on two opposite sides of the mover body; the two first permanent magnets, which are oppositely spaced apart from each other, are located between the two groups of driven assemblies;
the first driving mechanism comprises a second armature winding; each of the driven assemblies comprises a second permanent magnet array, and the second permanent magnet array comprises at least one second permanent magnet; and the second permanent magnet and the second armature winding drive, by current excitation, the mover body to move along the magnetic power conveyor line or the mixed conveyor line.

7. The mover according to claim 1, further comprising:
a first sliding assembly, arranged on the mover body and configured to be movable mounted on the magnetic power conveyor line; and
a second sliding assembly, arranged on the driven assembly, spaced apart from the first sliding assembly, and configured to be movable mounted on the mixed conveyor line; or
the mover comprising:
a first sliding assembly, arranged on the mover body, configured to be movable mounted on the magnetic power conveyor line, and spaced apart from the driven assembly.

8. The mover according to claim 1, further comprising:
a distance sensing apparatus, connected with the mover body and configured to detect a moving position of the mover.

9. The mover according to claim 1, wherein
permanent magnets in the second magnetic steel group and permanent magnets in the first magnetic steel group are arranged in a one-to-one correspondence; a magnetization direction of the permanent magnets in the second magnetic steel group is the same as a magnetization direction of a corresponding permanent magnets in the first magnetic steel group;
one or more sub-magnets in the magnet module are arranged in a Halbach array;
the magnet module comprises a mounting rack, and the mounting rack is detachable connected with the mover body; and the plurality of sub-magnets are arranged adjacent to or spaced apart from the mounting rack.

10. The mover according to claim 1, wherein the magnet module comprises a first sub-magnet, a second sub-magnet, a third sub-magnet and a fourth sub-magnet, which are arranged in the first preset direction;
alternatively, a magnetization direction of the first sub-magnet is in a third preset direction, and the third preset direction is perpendicular to the first preset direction and the second preset direction;
a magnetization direction of the second sub-magnet is in a fourth preset direction, and the fourth preset direction is parallel to the first preset direction;
a magnetization direction of the third sub-magnet is in a fifth preset direction, and the fifth preset direction is opposite to the third preset direction; and
a magnetization direction of the fourth sub-magnet is in a sixth preset direction, and the sixth preset direction is opposite to the fourth preset direction.

11. The mover according to claim 10, wherein a plurality of magnet modules of the first magnetic steel group comprise at least one first magnet module or/and at least one second magnet module, wherein
the first sub-magnet, the second sub-magnet, the third sub-magnet and the fourth sub-magnet in the first magnet module are successively arranged in the first preset direction; and the second sub-magnet, the first sub-magnet, the fourth sub-magnet and the third sub-magnet in the second magnet module are successively arranged in the first preset direction.

12. The mover according to claim 10, wherein
in the first magnetic steel group, a magnetization direction of the permanent magnets located on a first end of the first magnetic steel group is in the third preset direction, and a magnetization direction of the permanent magnets located on a second end of the first magnetic steel group is in the fifth preset direction; or
in the first magnetic steel group, in the first preset direction, a magnetization direction of the permanent magnets located on a first end of the first magnetic steel group is in the fourth preset direction, and a magnetization direction of the permanent magnets located on a second end of the first magnetic steel group is in the sixth preset direction.

13. The mover according to claim 1, wherein the plurality of permanent magnets in the magnet module are arranged in a Halbach array, wherein
a side of the first magnetic steel group that is close to the second magnetic steel group obtains magnetic field enhancement, and a side of the second magnetic steel group that is close to the first magnetic steel group obtains magnetic field enhancement.

14. A mixed conveyor line, comprising a magnetic power conveyor line, an auxiliary conveyor line and the mover as claimed in claim 1, wherein the mover is movable mounted on the magnetic power conveyor line or the auxiliary conveyor line; the magnetic power conveyor line comprises a first armature winding and a first guide rail; a first permanent magnet array is mated with the first armature winding to drive the mover to move along the first guide rail; the auxiliary conveyor line comprises a first driving mechanism and a second guide rail; and a driven assembly is mated with the first driving mechanism to drive the mover to move along the second guide rail.

15. The mixed conveyor line according to claim 14, wherein
there are a plurality of movers arranged; each of the movers comprises a buffer member; when the plurality of movers are all mounted on the magnetic power conveyor line or the auxiliary conveyor line, in a moving direction of the movers, buffer members are correspondingly arranged on two opposite sides of mover bodies; or
the mixed conveyor line is provided with at least one arc section; and at the arc section, the first guide rail and the second guide rail are arranged in a non-collinear manner.

16. The mixed conveyor line according to claim 14, wherein
the first driving mechanism comprises a transport member and an docking structure; the transport member is in transport connection with the docking structure, so as to drive at least part of the docking structure to move in a guide direction of the second guide rail; the docking structure is configured to be connected with the mover, so as to cause the mover to move along the second guide rail;
the auxiliary conveyor line comprises a position sensing assembly; the position sensing assembly comprises a plurality of position sensors, and a controller electrically connected with the plurality of position sensors; the plurality of position sensors are successively arranged along the second guide rail, and are configured to detect position information of the mover and output the position information to the controller; and the controller is configured to adjust, according to the position information, a driving speed of the first driving mechanism to the mover.

17. The mixed conveyor line according to claim 16, wherein each of the plurality of the position sensors comprises a signal transmitter and a signal receiver; one of the signal transmitter and the signal receiver is arranged on one side of the second guide rail, and the other one is configured to be connected with the mover; or
the signal transmitter and the signal receiver are both arranged on the second guide rail, wherein
when a signal, from the signal transmitter, received by the signal receiver is changed, the signal receiver outputs the position information of the mover to the controller.

18. The mixed conveyor line according to claim 17, wherein each of the plurality of the position sensors comprises at least one of a magnetic grating sensor, an optical grating sensor, an infrared sensor, a color sensor, or a Hall sensor.

19. The mixed conveyor line according to claim 16, wherein the first driving mechanism comprises at least one of a friction transport structure, a fixed transport structure or a magnetic transport structure; when the first driving mechanism comprises the friction transport structure, the docking structure comprises:
a synchronous belt, wherein a conveyor direction of the synchronous belt is parallel to the guide direction of the second guide rail; and
the transport member comprises:
two synchronous pulleys, spaced apart from each other; and
a support structure, configured to support the synchronous belt, wherein the synchronous belt is connected with peripheral sides of the two synchronous pulleys in a sleeving manner; the support structure is located between the two synchronous pulleys, and is located within a range that is enclosed by the two synchronous pulleys and the synchronous belt; and the support structure extends in the conveyor direction of the synchronous belt.

20. The mixed conveyor line according to claim 19, wherein the support structure comprises a hard support plate and a soft support plate; the hard support plate and the soft support plate are stacked in a direction perpendicular to a surface of the synchronous belt; and the soft support plate is located between the hard support plate and the synchronous belt, and is configured to support a portion of the synchronous belt that drives the mover to move.

21. The mixed conveyor line according to claim 20, wherein the support structure further comprises at least two transition members; and the two transition members are arranged between the soft support plate and the synchronous belt, and are located on two ends of the soft support plate that are close to the synchronous pulleys.

22. The mixed conveyor line according to claim 16, wherein the first driving mechanism comprises at least one of a friction transport structure, a fixed transport structure or a magnetic transport structure; when the first driving mechanism comprises the friction transport structure, the docking structure comprises:
a synchronous belt, wherein a conveyor direction of the synchronous belt is parallel to the guide direction of the second guide rail; and
the transport member comprises:
a plurality of synchronous pulleys, arranged at intervals, wherein the synchronous belt is connected with peripheral sides of the synchronous pulleys in a sleeving manner.

23. The mixed conveyor line according to claim 19, wherein the magnetic power conveyor line and the auxiliary conveyor line are successively arranged along the second guide rail and are docked with each other; and the mover is movable moved, along the second guide rail, between the magnetic power conveyor line and the auxiliary conveyor line.

24. The mixed conveyor line according to claim 23, wherein the first driving mechanism comprises: a docking structure that achieves docking by friction transport; or a docking structure that achieves docking by fixed transport; or a docking structure that achieves docking by magnetic transport.

25. The mixed conveyor line according to claim 24, wherein the mover comprises:
a mover body; and
a driven assembly, comprising a fixed structure and a friction structure, wherein the fixed structure is fixed on the mover body; the friction structure comprises a guide rod and an elastic member; one end of the guide rod is movable connected with the fixed structure, and the other end is fixedly connected with the friction structure; the friction structure is configured to be in contact with the synchronous belt and generate a frictional force; and the elastic member is sleeved on a peripheral side of the guide rod, and is located between the fixed structure and the friction structure.

26. The mixed conveyor line according to claim 25, wherein the fixed structure is provided with a mounting surface close to the synchronous belt, and the friction structure is provided with a friction surface close to the synchronous belt;

the synchronous belt is provided with an internal contact surface and an external contact surface, the internal contact surface is configured to be in contact with the synchronous pulleys, so as to generate frictional resistance between the synchronous belt and the synchronous pulleys, and the external contact surface is arranged opposite to the mounting surface;

the friction structure is configured to be in contact with the external contact surface; and in a telescoping direction of the elastic member, a distance between the mounting surface and the internal contact surface is L1, a distance between the mounting surface and the external contact surface is L2, a distance between the mounting surface and the friction surface is L3, and a conditional expression: L1>L3>L2 is met.

27. The mixed conveyor line according to claim 23, wherein there are a plurality of groups of magnetic power conveyor lines, and there are a plurality of groups of auxiliary conveyor lines; the magnetic power conveyor lines and the auxiliary conveyor lines are successively alternately arranged along the second guide rail; or the mover comprises a sliding block, and the sliding block is slidably connected with the second guide rail or the first guide rail; and when the auxiliary conveyor lines are docked with the magnetic power conveyor lines, the second guide rail is docked with the first guide rail, and the sliding block is capable of moving between the second guide rail and the first guide rail.

28. The mixed conveyor line according to claim 16, further comprising docking assemblies, wherein there are at least two groups of docking assemblies; one docking assembly connects a tail of the magnetic power conveyor line with a head of the auxiliary conveyor line, and another docking assembly connects a head of the magnetic power conveyor line with a tail of the auxiliary conveyor line; and the mover is movable connected with the magnetic power conveyor line and the auxiliary conveyor line along the second guide rail.

29. The mixed conveyor line according to claim 28, wherein there are a plurality of groups of magnetic power conveyor lines; there are a plurality of groups of auxiliary conveyor lines, and one of the auxiliary conveyor lines is used as a reflux section; the plurality of groups of magnetic power conveyor lines and the plurality of groups of auxiliary conveyor lines are successively alternately arranged along the second guide rail, so as to form a conveying section; and one docking assembly connects a tail of the conveying section with a head of the reflux section, and another docking assembly connects a head of the reflux section with a tail of the conveying section.

* * * * *